United States Patent [19]

Kuroda et al.

[11] 4,218,880
[45] Aug. 26, 1980

[54] SPARK-IGNITION INTERNAL COMBUSTION ENGINE

[75] Inventors: Hiroshi Kuroda, Tokyo; Yasuo Nakajima, Yokosuka; Yoshimasa Hayashi; Shin-ichi Nagumo, both of Yokohama, all of Japan

[73] Assignee: Nissan Motor Company, Limited, Yokohama, Japan

[21] Appl. No.: 744,098

[22] Filed: Nov. 22, 1976

[30] Foreign Application Priority Data

Dec. 1, 1975 [JP] Japan .................. 50-143585

[51] Int. Cl.² ............ F02M 25/06; F02D 21/08
[52] U.S. Cl. ............................. 60/278; 60/323;
123/568; 123/640; 123/310; 123/657
[58] Field of Search .......... 60/323, 278; 123/119 A,
123/191 M, 148 DS, 148 C

[56] References Cited

U.S. PATENT DOCUMENTS

| | | | |
|---|---|---|---|
| 2,257,631 | 9/1941 | Wahlberg | 60/323 |
| 2,469,448 | 5/1949 | Barber | 123/191 M |
| 2,481,890 | 9/1949 | Toews | 123/148 C |
| 3,739,797 | 6/1973 | Caldwell | 123/119 A |
| 3,809,042 | 5/1974 | Hosho et al. | 123/148 C |
| 3,818,880 | 6/1974 | Dawson et al. | 123/119 A |
| 3,924,582 | 12/1975 | Yagi et al. | 123/148 C |
| 3,926,161 | 12/1975 | Wertheimer | 123/119 A |
| 3,929,115 | 12/1975 | Yamauti et al. | 123/148 DS |
| 3,945,365 | 3/1976 | Regueiro | 123/148 DS |

FOREIGN PATENT DOCUMENTS

| | | | |
|---|---|---|---|
| 2621533 | 9/1976 | Fed. Rep. of Germany | 123/148 C |
| 2622320 | 9/1976 | Fed. Rep. of Germany | 123/148 C |
| 2623742 | 9/1976 | Fed. Rep. of Germany | 123/148 C |
| 2621599 | 11/1976 | Fed. Rep. of Germany | 60/278 |
| 2626773 | 1/1977 | Fed. Rep. of Germany | 60/278 |
| 302791 | 11/1932 | Italy | 123/191 M |

OTHER PUBLICATIONS

S.A.E. Paper 720007, Jan. 10–14, 1972, "Measuring the Effect of Spark Plug and Ignition System Design on Eng. Perf.".

S.A.E. Paper 700081, Jan. 12–16, 1970, "Spark Plug Design Factors and Their Effect on Eng. Performance".

*Primary Examiner*—Wendell E. Burns

[57] ABSTRACT

A spark plug is located in a combustion chamber so as to decrease the combustion time of the charge inducted into the combustion chamber. The charge is formed, before inducted into the combustion chamber, by mixing an air-fuel mixture and substantially inert gas such as exhaust gas so that the weight ratio of the fuel combusted in the combustion chamber and the substantially inert gas falls within the range from 1:13.5 to 1:18.5 during normal engine operation.

48 Claims, 26 Drawing Figures

SPARK-IGNITION INTERNAL COMBUSTION ENGINE

This invention relates to a spark-ignition internal combustion engine of the type in which substantially inert gases are added to the charge into the combustion chamber to decrease the formation of nitrogen oxides.

In connection with the exhaust gas control of a spark-ignition internal combustion engine which discharges exhaust gases containing, as noxious constituents, nitrogen oxides, carbon monoxide and hydrocarbons, the formation and emission level of nitrogen oxides (NOx) is increased as the combustion process in the combustion chamber is improved. Conversely hydrocarbons (HC) and carbon monoxide (CO) emission levels are increased as the combustion process deteriorates.

Of the emission levels into the environment of these noxious constituents, those of HC and CO can be easily decreased by improving the combustion in the combustion chamber, or by means of a catalytic converter or a thermal reactor. However, the formation of NOx is considerably more difficult to decrease, because the formation thereof is increased as the combustion conditions are improved, and NOx once generated in the combustion chamber is not easily removed by a catalytical reduction reaction, the catalyst also producing problems with respect to performance and durability. Therefore, the greatest effort is now directed to the decrease of the NOx generation. Since the NOx emission control downstream of the combustion chamber encounters the above-mentioned problems, it seems easier to achieve generation of NOx within the combustion chamber. For this purpose, it has been proposed to supply substantially inert gases such as exhaust gases into the combustion chamber in order to lower the maximum temperature of combustion carried out in the combustion chamber. This is achieved, for example, by a so-called exhaust gas recirculation system (EGR system). With this supply of the substantially inert gases, the emission level of NOx is found to decrease as the amount of the inert gases is increased. However, by supplying the combustion chamber with a considerable amount of the inert gases, the combustion time of the air-fuel mixture is increased and therefore stable and smooth combustion of the air-fuel mixture in the combustion chamber fails. In view of the above, the amount of the inert gases supplied to the combustion chamber is restricted to a relatively low level in due consideration of both stable combustion and NOx generation control. The unstable combustion of the air-fuel mixture causes deterioration of engine power output and fuel consumption characteristics, and increase of the emission levels of CO and HC.

In this regard, the inventors' attention is directed to the fact that the stable combustion in the combustion chamber is obtained by faster combustion of the air-fuel mixture in the combustion chamber by decreasing the combustion time of the air-fuel mixture.

It is, therefore, the prime object of the present invention to provide an improved spark-ignition internal combustion engine in which NOx generation is decreased by adding substantially inert gas to the air-fuel mixture supplied to the comnustion chamber, without deterioration of the combustion in the combustion chamber and of the engine operating characteristics.

Another object of the present invention is to provide an improved spark-ignition internal combustion engine of the type wherein substantially inert gases are added to the air-fuel mixture supplied to the combustion chamber, in which a spark plug is located in the combustion chamber such that the travel distance of the flame produced by the spark of the plug in the combustion chamber filled with the air-fuel mixture is shortened to decrease the combustion time of the air-fuel mixture in the combustion chamber, thereby achieving the stable and smooth combustion of the air-fuel mixture and decreasing the emission levels of CO and HC.

A further object of the present invention is to provide an improved spark-ignition internal combustion engine of the type wherein the air-fuel mixture mixed with a relatively large amount of substantially inert gases is effectively combusted by igniting with a spark plug suitably located to achieve stable and smooth combustion of the air-fuel mixture, in which the emission levels of CO and HC into the environment are further decreased by oxidizing the unburned constituents contained in the exhaust gases discharged from the combustion chamber in a reactor installed downstream of the combustion chamber.

Other objects, features and advantages of the improved spark-ignition internal combustion engine in accordance with the present invention will become more apparent from the following description of preferred embodiments as it progresses, taken in conjunction with the accompanying drawings in which like reference numerals designate like parts and elements, and in which.

FIGS. 19 to 26 inclusive are schematical plan views of second to ninth preferred embodiments inclusive of the engine in accordance with the present invention.

Figures 1, 2:
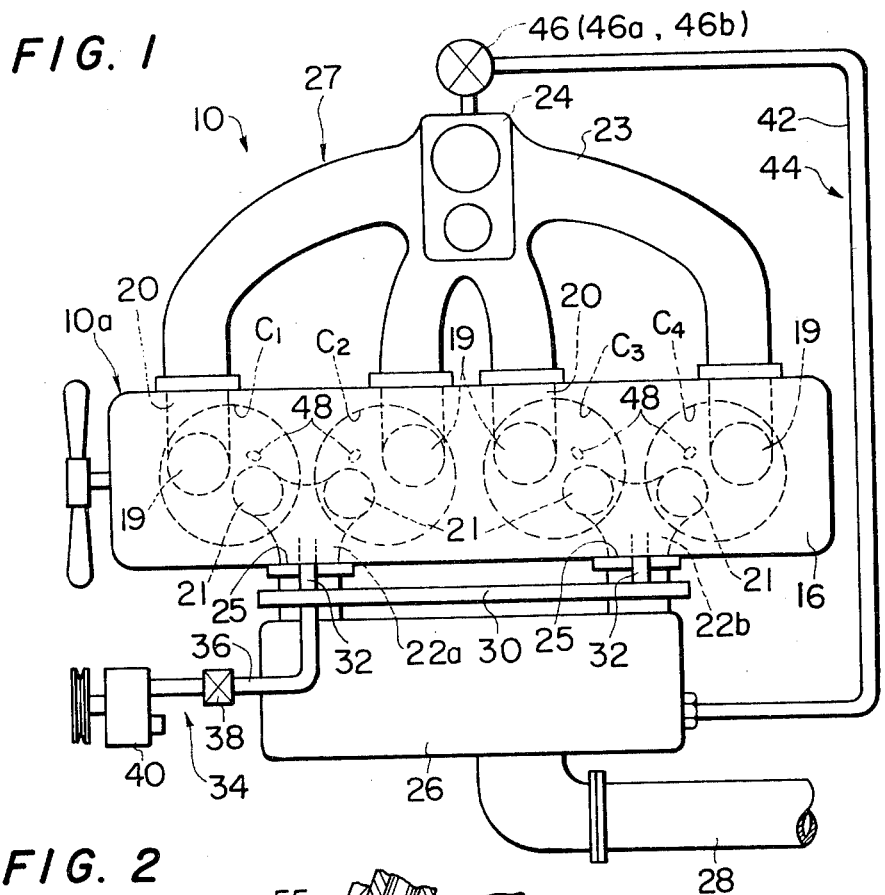
FIG. 1 is a schematical plan view of a first preferred embodiment of a spark-ignition internal combustion engine in accordance with the present invention.
FIG. 2 is a vertical section view showing an example of a cylinder head and a piston which define a combustion chamber of the engine of FIG. 1.
Figure 3:
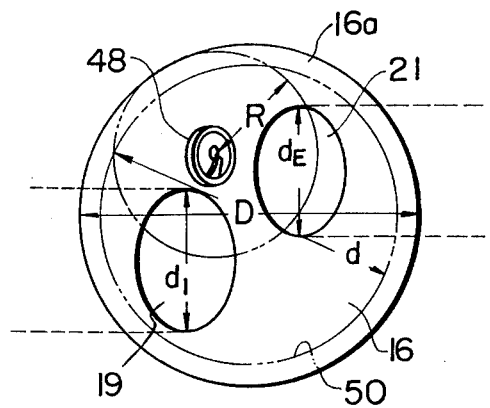
FIG. 3 is a plan view of a portion of the cylinder head defining the top of the combustion chamber of FIG. 2.

Referring now to FIGS. 1, 2 and 3 of the drawings, a first preferred embodiment of a spark-ignition internal combustion engine in accordance with the present invention is shown, in which the engine is generally designated by the reference numeral 10. The engine of this instance is an in-line, four cylinder type and accordingly the engine proper 10a has four aligned combustion chambers $C_1$ to $C_4$ therein. As clearly shown in FIG. 2, each combustion chamber is defined by the cylindrical inner surface of a cylinder 12 formed in a cylinder block 14, the inner surface of a cylinder head 16 closing one (upper) end of the cylinder 12, and the crown of a piston 18. The combustion chamber is communicable through each intake valve 19 with each intake port 20 which is, in turn, communicable through an intake manifold 23 with a carburetor 24 forming part of air-fuel mixture supply means 27 or the intake system of the engine. The carburetor 24 is arranged to supply the combustion chamber with an air-fuel mixture having a mean air-fuel ratio slightly lower than stoichiometric, such as a mixture having an air-fuel ratio ranging from 13:1 to 15:1 during normal engine operation on gasoline. As seen, the outlets (no numerals) of the two exhaust ports communicable, respectively, through exhaust valves 21 with the two adjacent combustion chambers $C_1$ and $C_2$, and $C_3$ and $C_4$ are combined with the so-called siamesed exhaust port outlets 22a or 22b each having only one exhaust outlet 25. The exhaust port outlets 22a and 22b communicate with a reactor 26 or reactor means forming part of the exhaust system of the engine. The reactor 26 functions to reduce the concentration of noxious constituents in the exhaust gases discharged from the combustion chambers by oxidizing the combustibles such as carbon monoxide (CO) and hydrocarbons (HC). It will be understood that the reactor 26 may be replaced by an exhaust manifold constructed to serve as the reactor. The reactor 26, in turn, communicated through an exhaust pipe 28 with the atmosphere.

Disposed adjacent to the inlets (no numerals) of the reactor 26 is a secondary air injection manifold 30 having two secondary air injection nozzles 32 which open to the exhaust port outlets 22a and 22b. The secondary air injection manifold 30 forms part of secondary air supply means 34 which is arranged to supply combustion air or secondary air into the reactor 26 to promote the oxidation reaction carried out in same. Accordingly, the secondary air injection manifold 30 is connected through a secondary air supply pipe 36 and a control valve 38 to an air pump 40. The secondary air supply means may be a device (not shown) for inducting atmospheric air into the exhaust system of the engine through a check valve by using an intermittent vacuum generated by the pulsation of exhaust gas pressure due to the open-and-close action of the exhaust valve of the engine.

Disposed connecting the reactor 26 and the intake manifold 23 is a conduit 42 or an exhaust gas recirculation passage for recirculation or supplying a portion of the exhaust gases passing the exhaust system (no numeral) of the engine through the intake manifold 23 into the combustion chambers $C_1$ to $C_4$. The conduit 42 forms part of exhaust gas recirculating means 44 or an exhaust gas recirculation system. An exhaust gas recirculation control valve 46 is disposed in the conduit 42 and is arranged to control the amount of the recirculated exhaust gases with respect to the amount of the intake air induced through the intake system in response, for example, to the venturi vacuum which is a function of the amount of the intake air. The venturi vacuum is generated at the venturi portion (not shown) of the carburetor 24.

Figure 4:
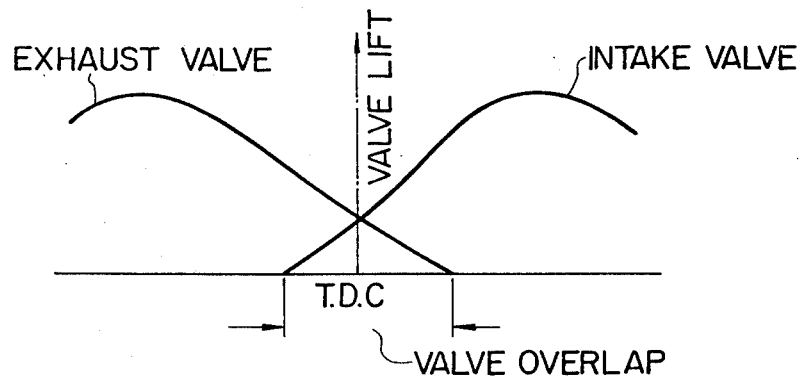
FIG. 4 is a graph showing the open valve overlap of the intake and exhaust valves of the engine of FIG. 1.

The exhaust gas recirculating means 44 is arranged to add substantially inert gas to the air-fuel mixture in the combustion chamber by only itself or in combination with means for controlling the increase of the so-called open valve overlap of the intake and exhaust valves 19 and 21 or the duration in which both the intake and exhaust valves 19 and 21 are open, as seen in FIG. 4. It will be appreciated that addition of the substantially inert gas to the air-fuel mixture in the combustion chamber results in lowering the maximum temperature of the combustion carried out in the combustion chamber, causing reduction of nitrogen oxides (NOx) formation level. The substantially inert gas consists of mixed gases which substantially do not participate or remain substantially inert in the combustion in the combustion chamber and therefore the inert gas includes (1) residual gas which is not discharged from the combustion chamber during the exhaust stroke and remains in the combustion chamber, (2) recirculated exhaust gas which is recirculated or supplied into the combustion chamber through the exhaust gas recirculating means 44, (3) nitrogen gas ($N_2$) contained in the intake or inducted air, and (4) oxygen gas ($O_2$) contained in excessive air in an air-fuel mixture leaner than stoichiometric in lean operation of the engine. It will be understood that the residual gas and the recirculated exhaust gas contain amongst other things carbon dioxide ($CO_2$), water vapour ($H_2O$) and nitrogen ($N_2$) gas. With respect to the residual gas, by controlling the open valve overlap of the intake and exhaust valves 19 and 21 within the range from 22 to 50 degrees of the crank angle, about 15 to 25% of the residual gas remains in the combustion chamber.

According to the present invention, the weight ratio of the fuel substantially combusted in the combustion chamber and the substantially inert gas added to the air-fuel mixture supplied to the combustion chamber, is selected to be within the range from 1:13.5 to 1:18.5 (this weight ratio is referred to as "fuel to inert gas ratio" hereinafter) during normal engine operation.

A spark plug 48 is located in each combustion chamber to achieve stable and smooth combustion of the air-fuel mixture in the combustion chamber by shortening the travel distance of the flame produced by the spark plug to decrease the combustion time of the air-fuel mixture in the combustion chamber, even though a large amount of the substantially inert gas is added to the air-fuel mixture so that the fuel-inert gas ratio is maintained within the range from 1:13.5 to 1:18.5.

As best seen in FIGS. 2 and 3, in order to attain the above-mentioned purpose, the location of the spark plug 48 in a hemispherical combustion chamber is selected such that the volume defined in the combustion chamber by the spherical surface of an imaginary sphere S (only its cross-section shown) occupies more than 35% of the combustion chamber which is defined between the cylinder head and the crown of the piston at top dead center; the imaginary sphere being formed with its center at the midpoint (not identified) of the spark gap g or the distance between central and side electrodes 48a and 48b with a radius R (meter), the radius R being calculated by the following equation:

$$R = \frac{60}{N} \times \frac{\theta}{360} \times Rc \quad \text{Eq. (1)}$$

$$= \frac{\theta Rc}{6N}$$

where,
$\theta$ = spark advance (the minimum advance determined by crank angle, before top dead center for attaining suitable exhaust gas temperature and stable engine operation)
N = engine speed (1200–2400 rpm)
Rc = combustion rate (m/s)

The above-mentioned radius R corresponds to the radius of the combustion volume (the volume produced by the combustion of the air-fuel mixture in the combustion chamber) which is spherically spread with the center at the midpoint of the spark gap of the spark plug 48 while the induced air-fuel mixture is ignited before top dead center and the piston 18 reaches the top dead center. Accordingly, this radius R is represented as the product of the combustion rate Rc and the time t required for piston movement from the position at which the ignition takes place to the position at top dead center, and consequently the time t is calculated as follows, using the engine speed N and the spark advance $\theta$:

$$t = \frac{1}{\frac{N}{60}} \times \frac{\theta}{360} \quad \text{Eq. (2)}$$

$$= \frac{60}{N} \times \frac{\theta}{360}$$

It will be understood from the foregoing that the radius R of the imaginary sphere S is obtained by the above-described equation Eq. (1). This radius R is approximately constant regardless of engine speed during normal engine speed range or an engine speed ranging from 1200 to 2400 rpm, becuase the spark advance is arranged to increase with the increase of engine speed during such an engine speed range.

In case in which the spark advance $\theta$ is set at 30 degrees of crank angle for attaining the best combustion of the air-fuel mixture during street or city cruising at the engine speed N of 2000 rpm, the radius of the imaginary sphere is calculated as follows, based on the fact that, in general, the combustion rate Rc is approximately 15 m/s:

$$R = \frac{60}{2000} \times \frac{30}{360} \times 15$$

$$= 3.75 \times 10^{-2} (m)$$

-continued $$= 37.5 \text{ mm}$$

Now, the experiments by the inventors have revealed that the stable and smooth combustion of the air-fuel mixture was achieved if more than 80% (by weight) of the air-fuel mixture of the total inducted air-fuel mixture had been combusted when the piston 18 descended from the top dead center by 15% of the total travel distance of the piston 18 or when the piston is at about 40 degrees of the crank angle after the top dead center.

Figure 5:
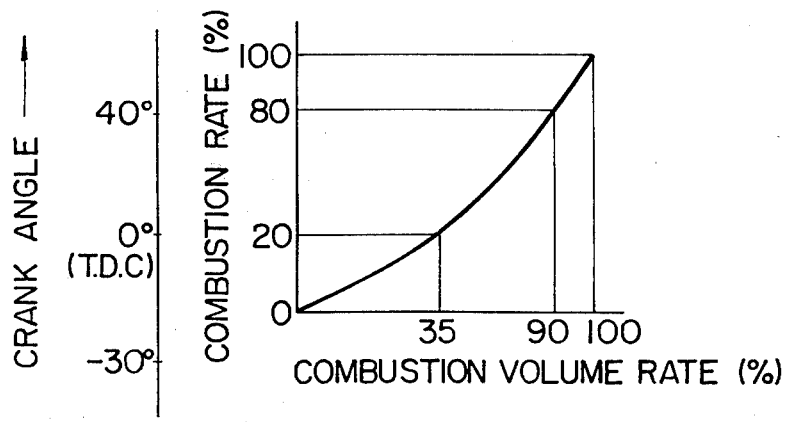
FIG. 5 is a graph showing the combustion manner in the combustion chamber of the engine of FIG. 1, in terms of crank angle, combustion rate and air-fuel mixture combustion volume rate.

With reference to the FIG. 5 graph which has been experimentally plotted, it will be understood that the above-mentioned more than 80% combustion will be attained by completing the combustion of about 20% (by weight) of the air-fuel mixture of the total inducted air-fuel mixture, when the piston is at the top dead center. As shown, when the above-mentioned about 20% of the air-fuel mixture is combusted, the volume of the air-fuel mixture combusted occupies about 35% of the volume of the combustion chamber defined between the cylinder head 16 and the crown of the piston 18 at the top dead center (this is referred to as "combustion volume rate" in FIG. 5). In this connection, "combustion rate" in FIG. 5 represents the weight % of the combusted air-fuel mixture with respect to the total inducted air-fuel mixture.

It will be apparent from the foregoing discussion, that, by locating the spark plug 48 so that the volume defined in the combustion chamber by the imaginary sphere S with the above-mentioned radius R occupies 35% of the combustion chamber defined between the cylinder head 16 and the crown of the piston at the top dead center, the distance of travel of the flame produced by the spark plug in the combustion chamber is shortened to decrease the combustion time of the air-fuel mixture in the combustion chamber and therefore stable and smooth combustion of the air-fuel mixture is achieved even though a large amount of the substantially inert gas is added to the air-fuel mixture inducted into the combustion chamber so that the fuel to inert gas ratio is maintained within the range from 1:13.5 to 1:18.5 during normal engine operation.

Referring again to FIGS. 2 and 3, the reference numeral 18a indicates a circular cavity formed in the crown of the piston 16. It is to be noted that the cavity 18a contributes to increase the volume in a portion of the combustion chamber defined by the imaginary sphere S in order to promote the effect obtained by the location of the spark plug 48. Additionally, the cylinder head 16 has a cavity 50 of a hemispherical shape, formed concentrically with respect to the bore of the cylinder 12. As shown, the cavity 50 forms a major part of the combustion chamber. As best seen in FIG. 3, the diameter d of the hemispherical cavity 50 is smaller than the one D of the bore of the cylinder 12 and consequently an annular space 52, called a squish area, is formed between the annular flat portion 16a of the cylinder head 16 defining the top of the combustion chamber and the peripheral portion of the crown of the piston 18 when at the top dead center thereof. With this squish area 52, during the last stage of the compression stroke of the piston 18, most of the air-fuel mixture or the charge supplied into the combustion chamber is squeezed out of the squish area 52 and moved toward the central portion of the combustion chamber to produce squish turbulence within the combustion chamber.

The squish turbulence promotes smooth and rapid burning of the air-fuel mixture in the combustion chamber and therefore contributes to further shortening of the combustion time. The reference numeral 54 represents a heat-resistant liner fixedly disposed on the inner surface of the exhaust port outlet 22a or 22b maintaining a space 55 between the inner surface of the exhaust port outlet and the outer surface of the liner.

With respect to the aforementioned selected fuel-inert gas ratio: if it is higher than its higher limit 1:13.5, the NOx decreasing formation effect is deteriorated; whereas if it is lower than its lower limit 1:18.5, stable combustion in the combustion chamber is not possible even with the most effective ignition with the selected location of the spark plug 48. Additionally, the NOx decreasing formation effect is not improved to any extent by doing same. The unstable combustion in the combustion chamber inevitably causes noticeable deterioration in the fuel economy and the engine output power.

In this connection, determination of the fuel to inert gas ratio will be explained hereinafter. Since the weight ratio of the fuel (gasoline or petrol) and the atmospheric air in the stoichiometric air-fuel mixture is 1:14.7 and the volume ratio of oxygen gas ($O_2$) and nitrogen gas ($N_2$) in the atmosphere is about 21:79, the weight ratio of the fuel and the nitrogen gas in the stoichiometric air-fuel mixture is 1:11.3. Now, when the substantially inert gas is added to the air-fuel mixture so that the recirculated exhaust gas, the residual gas and the excessive air (when the combustion chamber is fed with an air-fuel mixture leaner than stoichiometric) are X%, Y% and Z% by weight, respectively, with respect to the intake or inducted air of the stoichiometric amount to the fuel combusted in the combustion chamber, the fuel to inert gas ratio is obtained by the following equation in consideration of the fact that the weight ratio of the intake air and the exhaust gases (the residual gas) is about 1:1;

$$1 : (11.3 + 14.7 \times (\frac{X + Y + Z}{100}))$$

In connection with the above, the intake air amount stoichiometric to the fuel combusted in the combustion chamber will be determined as follows:

(I) In case where the combustion chamber of the engine is supplied with stoichiometric air-fuel mixture, the amount of combusted fuel corresponds to the amount of the total fuel inducted into the combustion chamber of the engine and accordingly the intake air amount stoichiometric to the total inducted fuel corresponds to the amount of total air inducted into the combustion chamber. Therefore, the intake air amount stoichiometric to the combusted fuel, in this case, is the total amount of air inducted into the combustion chamber.

(II) In case where the combustion chamber is supplied with an air-fuel mixture leaner than stoichiometric, the combusted fuel amount corresponds to the total amount of fuel inducted into the combustion chamber and accordingly the total air amount stoichiometric to the total inducted fuel corresponds to the remaining amount of the excessive air from the total inducted air. Therefore, the intake air amount stoichiometric to the combusted fuel, in this case, is the remainder of the excessive air amount from the total inducted air.

For instance, when the combustion chamber of the engine is supplied with an air-fuel mixture having an air-fuel ratio of 16:1, the inducted air amount stoichiometric to 1 kg of the combusted fuel is 14.7 kg; the excessive air amount 1.3 kg. In this case, the excessive air is, as previously described, the inert gas which does not participate in the combustion, and its rate to the inducted air amount stoichiometric to the combusted fuel is $$1.3/14.7 \times 100 \fallingdotseq 8.8\%.$$

(III) In case where the combustion chamber is supplied with an air-fuel mixture richer than stoichiometric, since the amount of combusted fuel corresponds to the fuel of the amount stoichiometric to the amount of total air inducted to the combustion chamber, the inducted air amount stoichiometric to the combusted fuel is the amount of total inducted air. For instance, when the combustion chamber is supplied with an air-fuel mixture having an air-fuel ratio of 13:1, the inducted air amount stoichiometric to 0.88 ($\fallingdotseq 13/14.7$) kg of the combusted fuel is 13 kg. In this case, 0.12 kg of excessive fuel (unburned fuel) remains, but it is an extremely small amount and therefore negligible.

Accordingly, on the assumption that the amounts of the recirculated exhaust gas, the residual gas, and the excessive air with respect to the inducted air amount stoichiometric to the combusted fuel are X%, Y% and Z%, respectively, when the combustion chamber is supplied with an air-fuel mixture richer than stoichiometric in which Z=O, the fuel-inert gas ratio is 1:(11.3+14.7×(X+Y)/100). When the combustion chamber is supplied with an air-fuel mixture leaner than stoichiometric and the excess air factor or actual inducted air weight/calculated air weight required for combustion is represented as λ (in the stoichiometric air-fuel mixture, λ=1), Z=(λ−1)×100 and therefore the fuel-inert gas ratio is 1:11.3+14.7×(X+Y+Z)/100=11.3+14.7×X+Y/100×(λ−1).

As is apparent from the foregoing discussion, when the combustion chamber is supplied with the stoichiometric air-fuel mixture (its air-fuel ratio, 14.7:1), and the recirculated exhaust gas and the residual gas are 30% and 15%, respectively, with respect to the amount of the inducted air, the fuel to inert gas ratio (the weight ratio of the combusted fuel and the substantially inert gas) is 1:17.9 (45% of exhaust gas+nitrogen gas=6.6+11.3).

When the air-fuel ratio of the air-fuel mixture supplied to the combustion chamber is 16.2:1 (in which the excess air factor λ÷1.1) and the recirculated exhaust gas and the residual gas are 10% and 10%, respectively, with respect to the amount of the inducted air stoichiometric to the amount of the fuel combusted in the combustion chamber, the fuel to inert gas ratio is 1:15.7 (20% of the exhaust gas+10% of the excessive air+nitrogen gas=2.9+1.5+11.3).

It will be understood that the required fuel to inert gas ratio is obtained by controlling the exhaust gas recirculated through the exhaust gas recirculation system 44, by controlling the residual gas by varying the valve overlap or employing a regulator valve (not shown) for regulating the exhaust back pressure applied to the combustion chamber, or by leaning out of the air-fuel mixture supplied to the combustion chamber by supplying excessive air into the combustion chamber, or by combining any or all of the above-mentioned measures.

With the arrangement described hereinbefore, during operation of the engine 10, a considerably large amount of the substantially inert gas containing the exhaust gas through the exhaust gas recirculating means 44 and the residual gas remaining in the combustion chamber is added to and mixed with the air-fuel mixture drawn into the combustion chamber. The air-fuel mixture mixed with the inert gas is ignited by the spark of the plug 48 disposed in each combustion chamber. When ignited by the spark of the plug 48 located in accordance with the present invention, the air-fuel mixture is combusted such that the travel distance of the flame produced by the spark is shortened to decrease the combustion time of the air-fuel mixture in the combustion chamber. Thus the combustion ignited by the spark is faster developed accomplishing stable and smooth combustion even though such a large amount of the inert gas is added to the air-fuel mixture to be combusted in the combustion chamber. Due to the effect of the inert gas, the maximum temperature of the combustion is low and consequently NOx generation in the combustion chamber is considerably decreased as compared with a conventional engine without the exhaust gas recirculation system.

Combusted gases or exhaust gases produced in the combustion chamber are thereafter introduced into the reactor 26, maintaining their temperature high. Within the reactor 26, CO and HC contained in the exhaust gases are effectively oxidized in the presence of oxygen supplied from the secondary air supply means 34.

Figure 6:
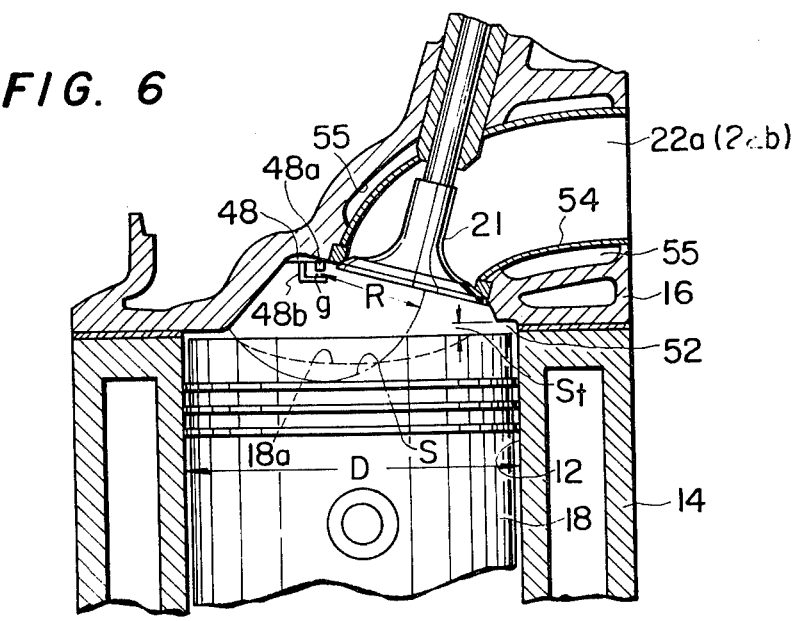
FIG. 6 is a vertical section view similar to FIG. 2, but shows another example.
Figure 7:
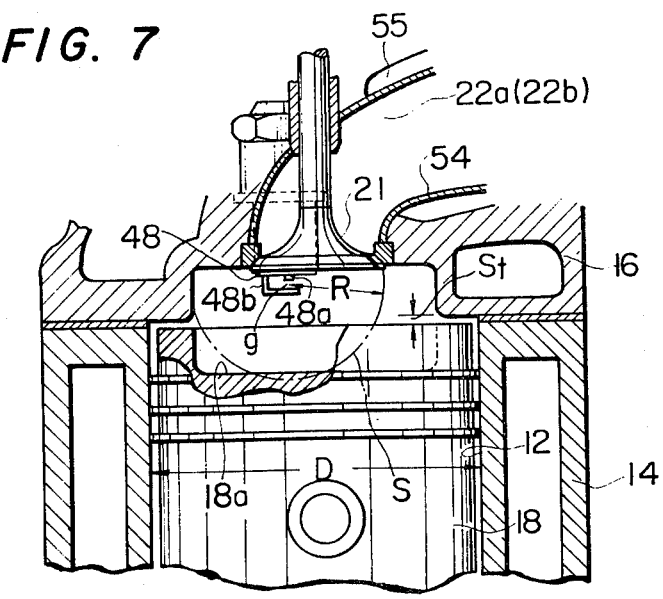
FIG. 7 is a vertical section view similar to FIG. 2, but shows a further example.

FIGS. 6 and 7 illustrate examples in which the spark plugs 48 are installed in the cylinder heads forming respectively thereinside wedge type combustion chambers and bath-tub type combustion chambers. In these examples, the spark plugs 48 are, of course, located in the respective combustion chambers to shorten the travel distance of the flame produced by the spark of the plugs 48 in the combustion chamber to decrease the combustion time of the air-fuel mixture in the combustion chamber. Consequently, the spark plug 48 disposed in the combustion chamber is, as shown, installed at the cylinder head 16 to project into a portion of the combustion chamber which portion is approximately farthest from the crown of the piston 18. Additionally, in these examples, the piston 18 are formed with cavities 18a, at their crowns, respectively, in order to promote the combustion time decreasing effect by increasing the combustion chamber volume contained in the imaginary spheres S.

Figure 8:
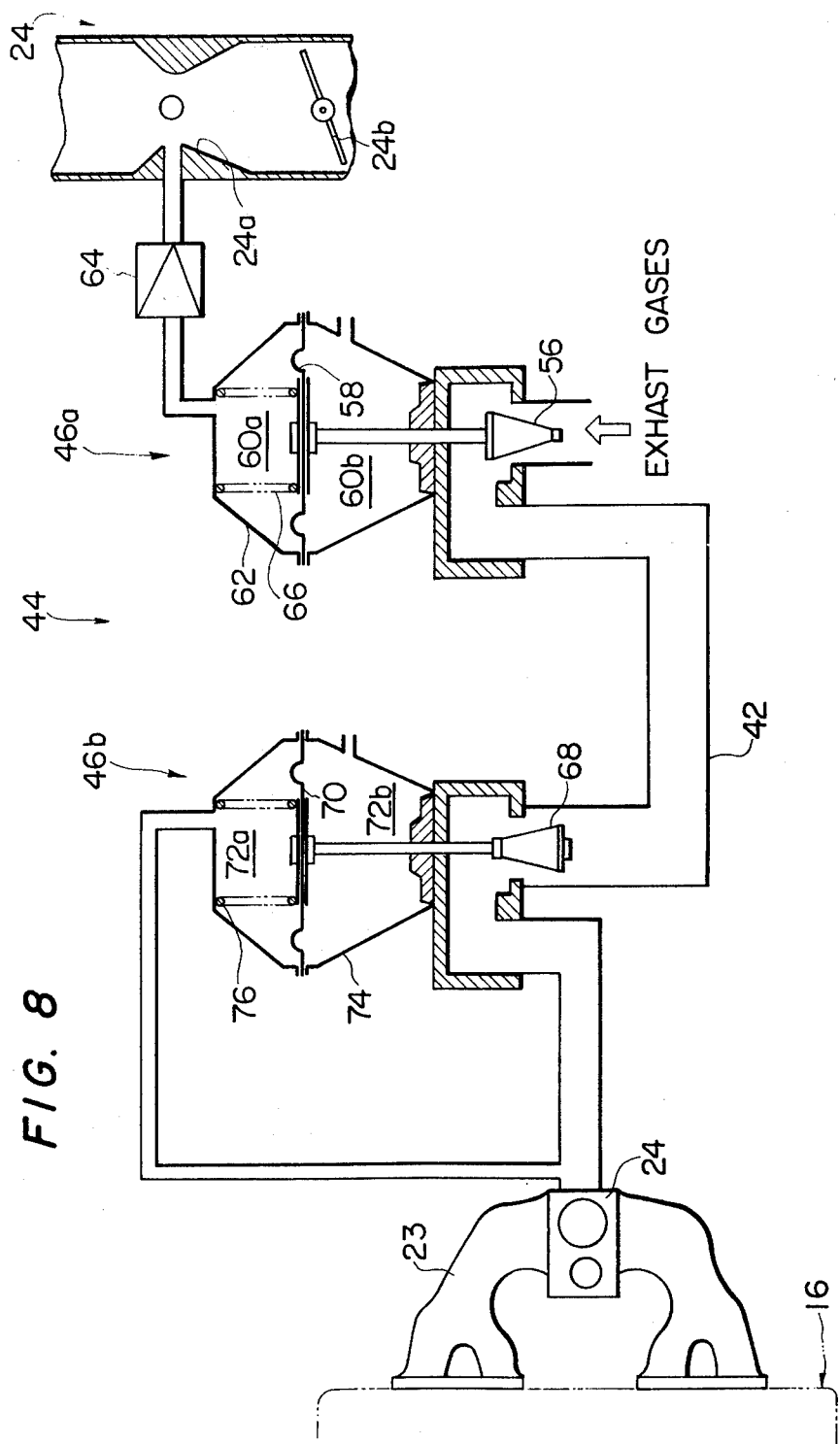
FIG. 8 is a schematical section view of an example of the exhaust gas recirculation control system of the engine of FIG. 1.
Figure 9:
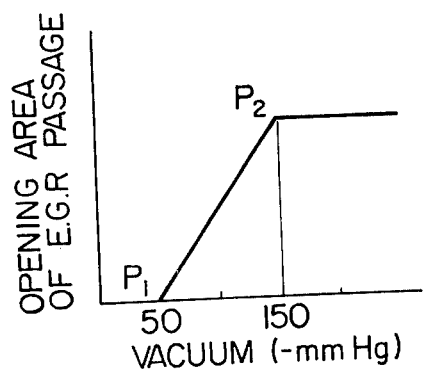
FIG. 9 is a graph showing the operating manner of the first exhaust gas recirculation control valve of FIG. 8.

FIG. 8 illustrates an example of the exhaust gas recirculation system or exhaust gas recirculating means 44 which is composed of the exhaust gas recirculation passage 42. The exhaust gas recirculation passage 42 connects a portion of the exhaust system (no numeral) such as the exhaust pipe 28 and the intake manifold 23 of the intake system 26. Disposed in the passage 42 is a first valve number or head 56 forming part of a first exhaust gas recirculation control valve 46a and arranged to open or close the passage 42. The valve head 56 is fixedly connected to a first vacuum responsive diaphragm 58 which defines a first vacuum chamber 60a and a first atmospheric chamber 60b within a first casing 62. The first vacuum chamber 60a communicates with the venturi portion 24a located upstream of the throttle valve 24b of the carburetor 24 through a vacuum amplifier 64 for amplifying the vacuum generated at the venturi portion 24a. The first diaphragm member 58 is normally urged by a first spring 66 disposed in the first vacuum chamber 60a in the direction to cause the first valve head 56 to close the passage 42 and is arranged to move in the direction to cause the first valve head 56 to open the passage 42 in response to the vacuum generated at the venturi portion 24a. As shown in FIG. 9, the first valve head 56 is arranged to start to open the passage 42 at a predetermined level $P_1$ of the vacuum applied on the first diaphragm member 58 and then to gradually increase the opening area defined by the first valve head 56 in the passage 42, and to fully open the passage 42 above a predetermined level $P_2$ of the vacuum applied on the first diaphragm member 58.

Figure 10:
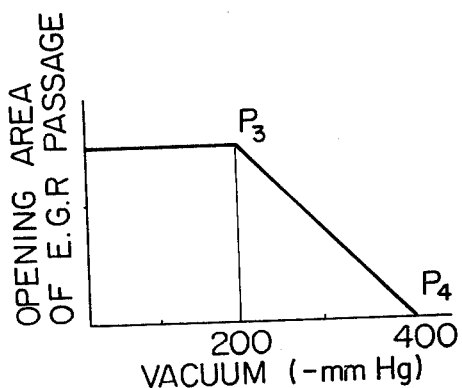
FIG. 10 is a graph showing the operating manner of the second exhaust gas recirculation control valve of FIG. 8.

A second valve head 68 is movably disposed in the passage 42 between the first valve head 56 and the intake manifold 23 and arranged to open or close the passage 42. The second valve head 68 forms part of a second exhaust gas recirculation control valve 46b and is connected to a second vacuum responsive diaphragm 70 which defines a second vacuum chamber 72a and a second atmospheric chamber 72b within a second casing 74. The second vacuum chamber 72a communicates with the passage 42 between the second valve head 68 and the intake manifold 23. The second diaphragm member 70 is normally urged by a second spring 76 disposed in the second vacuum chamber 72a in the direction to cause the second valve head 68 to seat and close the passage 42 and arranged to cause the valve head 68 to unseat and open the passage 42 in response to the intake manifold vacuum generated in the intake manifold 23. As shown in FIG. 10, the second valve head 68 is arranged to start to seat and close the passage 42 from its fully open state at a predetermined level $P_3$ of the intake manifold vacuum applied on the second diaphragm member 70 and then to fully close the passage 42 at a predetermined level $P_4$ of the intake manifold vacuum.

Figure 11:
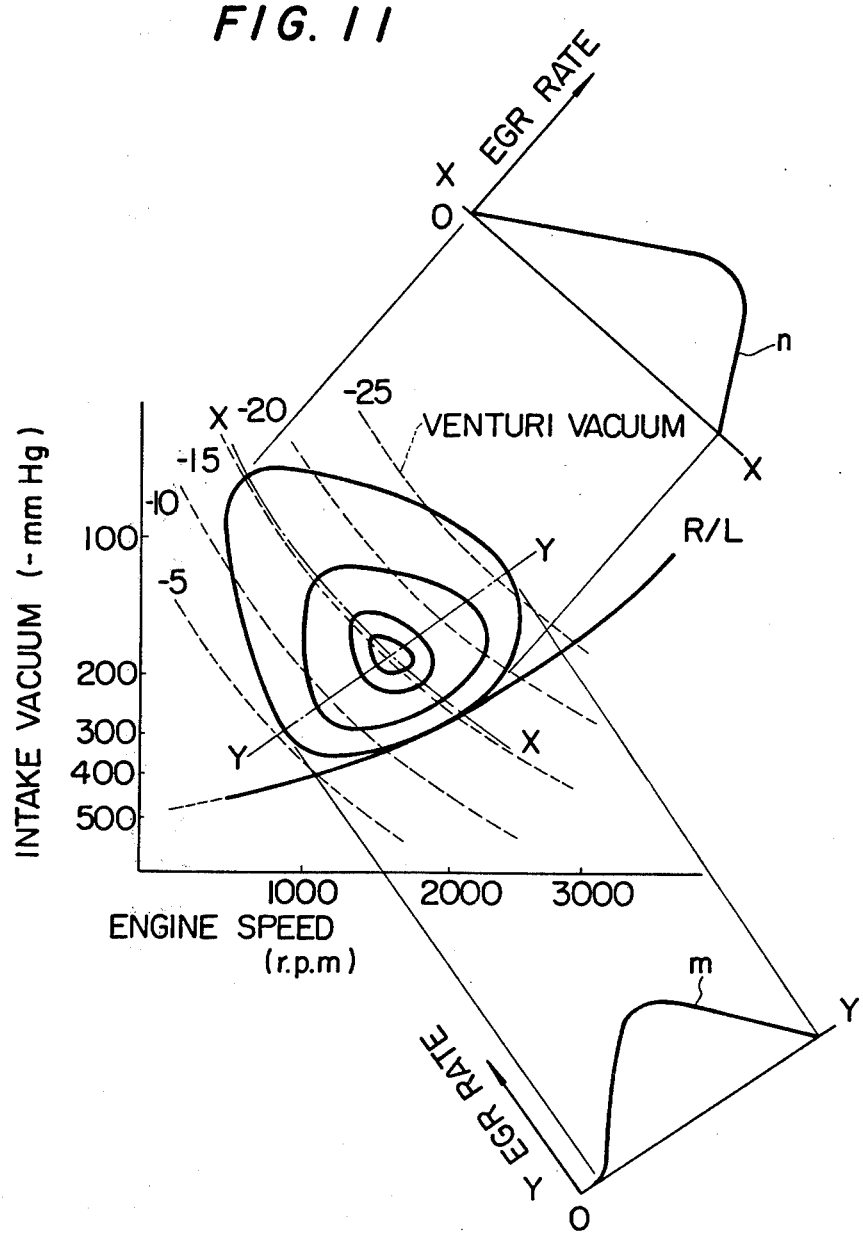
FIG. 11 is a graph showing the exhaust gas recirculation rate characteristics by the exhaust gas recirculation control system of FIG. 8, in terms of intake vacuum and engine speed.

With the previously described first and second exhaust gas recirculation control valves 46a and 46b, the weight rate of the exhaust gas recirculated into the combustion chamber with respect to the inducted air (the weight rate is referred to as "EGR rate" hereinafter) is controlled in a pattern shown in FIG. 11 where contour lines represent various venturi vacuums and a line R/L indicates an engine operating range at road load or the engine load required for even road cruising. By suitably determining the characteristics of vacuum-passage areas (of the exhaust gas recirculation passage 42) of the control valves 46a and 46b in addition to the above-mentioned arrangement, the maximum EGR rate can be set at the normal engine operating range or the city cruising range at an engine speed of 1400 to 2000 rpm, and at an operating range where the frequency of acceleration is the highest during the normal operating range, i.e., an operating range in which the intake manifold vacuum is from 150 to 200 mmHg.

Figure 12:
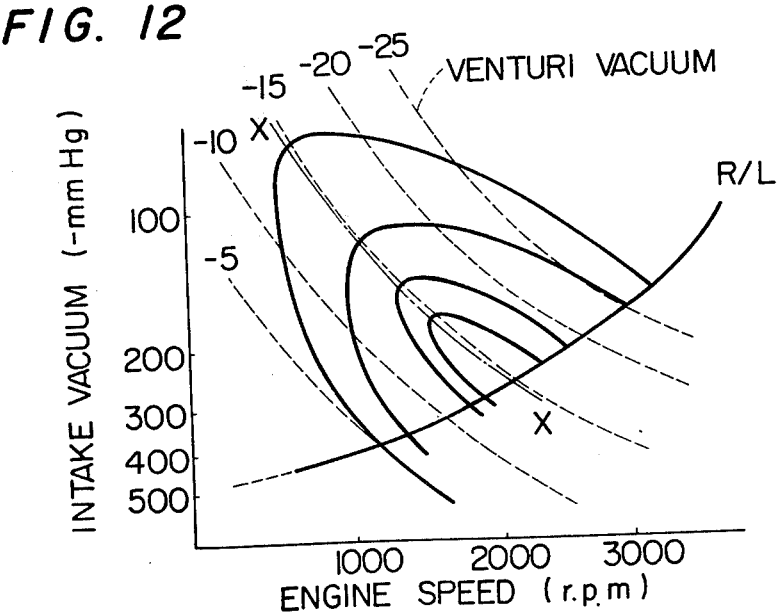
FIG. 12 is a graph similar to FIG. 11, but shows another exhaust gas recirculation rate characteristics.

This depends on the following facts: since the first exhaust gas recirculation control valve 46a is operated in response to the vacuum amplified by the vacuum amplifier 64, when the vacuum amplifier 64 amplifies the venturi vacuum ten times and the predetermined pressure levels $P_1$ and $P_2$ are respectively 50 mmHg and 150 mmHg, the EGR rate starts to gradually increase from a venturi vacuum of 5 mmHg and reaches its maximum level at a venturi vacuum of 15 mmHg, and thereafter the maximum level is maintained. However, since the amount of the intake air increases with the increase of the engine speed and the intake vacuum, when the venturi vacuum increases, for example, above the venturi vacuum contour line X—X representing a venturi vacuum of 15 mmHg as seen in FIG. 12, the EGR rate is decreased in the case where the amount of the recirculated exhaust gas is constant to control the EGR rate in a pattern shown in FIG. 12. Accordingly, if the EGR rate control is carried out only by the first exhaust gas recirculation control valve 46a, the EGR rate reaches maximum at the low load engine operating range on the line R/L representing the engine operation at road load and consequently stable operation of the engine fails. Additionally, since a relatively high EGR rate occurs at an engine operating range encountered during engine deceleration and running on a downhill having a slight down grade, which range resides under the line R/L in FIG. 12, the temperature in the combustion chamber is lowered during engine deceleration and therefore large amounts of HC and CO are discharged out of the combustion chamber. Furthermore, the HC and CO are discharged into the atmosphere without undergoing effective oxidation reaction in the reactor 26, because the reactor temperature sufficient for the effective oxidation reaction cannot be maintained due to the lowered combustion chamber temperature.

In order to overcome the above-mentioned difficulties, the EGR rate control is carried out in combination of the first and second exhaust gas recirculation control valves 46a and 46b.

Figure 13:
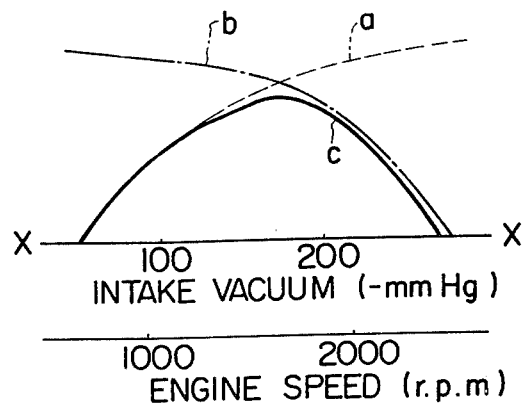
FIG. 13 is a graph showing the operating characteristics of the exhaust gas recirculation control valves of the system of FIG. 8.

With respect to the second exhaust gas recirculation control valve 46b, when the predetermined vacuum levels $P_3$ and $P_4$ of the second exhaust gas recirculation control valve 46b are, for example, 200 mmHg and 400 mmHg, respectively, the amount of the recirculated exhaust gas decreases with the increase of the intake vacuum as shown by a characteristics indicated at a line b in FIG. 13 and therefore the characteristics b has an inverse tendency to a characteristics indicated at a line a of the first exhaust gas recirculation control valve 46a, i.e. by the characteristics b the EGR rate decreases within the intake vacuum range from 200 mmHg to 400 mmHg. It will be understood that the total characteristics of the EGR rate control by the first and second exhaust gas recirculation control valves 46a and 46b are represented by a composed line c and accordingly the EGR rate control characteristics becomes one shown in FIG. 11 where the maximum point of the EGR rate resides at the engine operating range where the intake vacuum is within the range from 150 mmHg to 200 mmHg and the engine speed is within the range from 1400 to 2000 rpm. In FIG. 11, a curve m indicates the cross-section of the EGR rate control characteristics indicated by the contour lines, taken along the line Y—Y which passes through the maximum point of the EGR rate and crosses the venturi vacuum controur line X—X, and a curve n indicates the cross-section of the same indicated characteristics, taken along the contour line X—X.

It will be appreciated that, according to the first and second exhaust gas recirculation control valves 46a and 46b, the maximum point of the EGR rate is set above the line R/L representing the engine operation at road load, and the engine operating range having the highest frequency of acceleration, i.e. the range in which the engine speed is from 1400 to 2000 rpm and the intake vacuum is from 150 mmHg to 200 mmHg. The control characteristics of EGR rate have a tendency where the EGR rate gradually decreases from the central contour line towards the circumferential contour line as indicated in FIG. 11. As a result, unstable engine operation at low load and engine speed range and the increase of HC and CO emission levels are effectively prevented, maintaining the EGR rate control characteristics as described hereinbefore.

Figure 14:
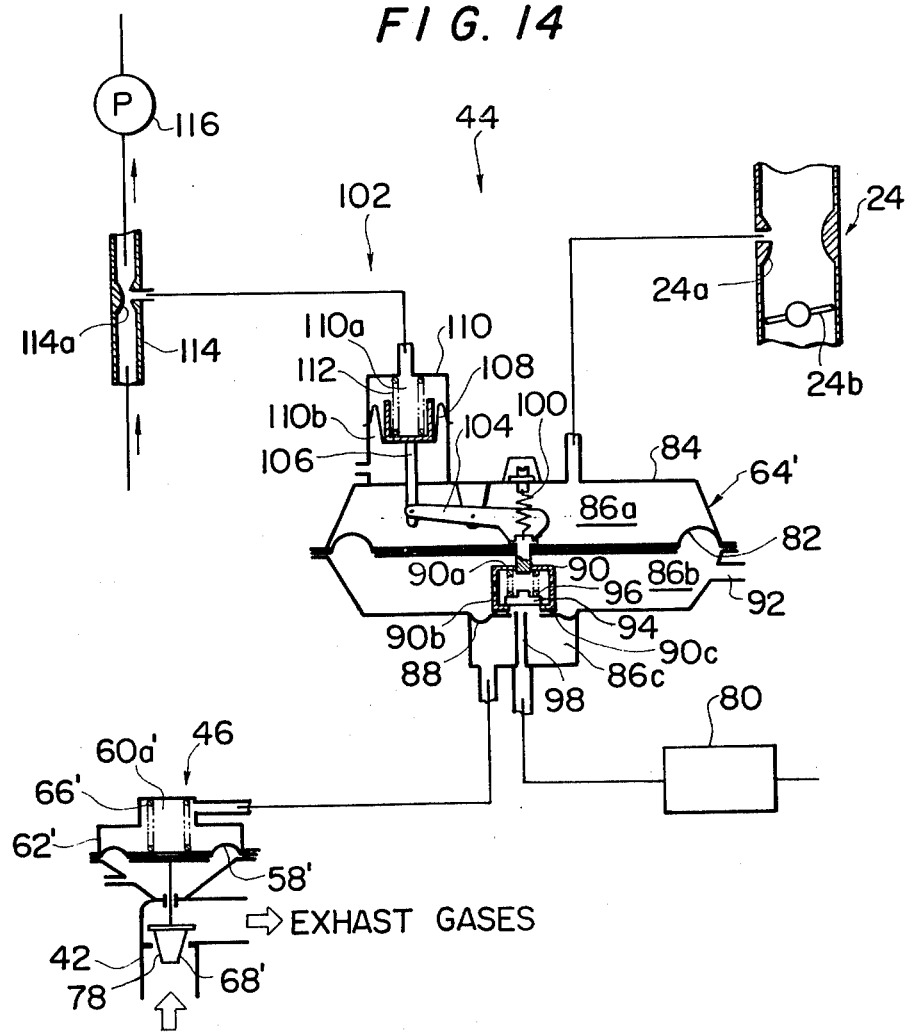
FIG. 14 is a schematical section view of another example of the exhaust gas recirculation control system of the engine of FIG. 1.

FIG. 14 illustrates another example of the exhaust gas recirculation control means 44 which includes the exhaust gas recirculation control valve 46. The valve 46 has a valve head 68' which is arranged to unseat or seat on the seat 78 formed in the exhaust gas recirculation passage 42. The valve head 68' is fixedly connected to a vacuum responsive diaphragm member 58' which is normally urged by a spring 66' in the direction to force the valve head 68' to seat and close the seat 78. The exhaust gas recirculation passage 42 is interconnected in a portion of the exhaust system (not shown) and a portion of the intake system (not shown). The diaphragm member 58' defines a vacuum chamber 60a' between the diaphragm member 58' and the upper portion of the casing 62'.

A vacuum amplifier, generally indicated at 64', interconnects the carburetor 24 and a vacuum source such as a known vacuum reservoir 80. The function of amplifier 64' is to provide a control output vacuum to the vacuum chamber 60a' of the exhaust gas recirculation control valve 46 for controlling the operation of the control valve 46. The control output vacuum is modulated by the venturi vacuum applied to the amplifier 64' from the venturi portion 24a of the carburetor 24. Hence, the term "amplifier" is used since the input vacuum is transformed into a higher vacuum of similar characteristics to the venturi vacuum from the venturi portion 24a. In short, the amplifier is means for providing a control output vacuum signal for the exhaust gas recirculation control valve 46 which is substantially proportional to the relatively low venturi vacuum.

The vacuum amplifier 64' includes first diaphragm means which is provided by a first diaphragm 82 disposed within a housing 84. The first diaphragm 82 defines an input vacuum chamber 86a between it and the upper portion of the housing 84. The input vacuum chamber 86a communicates with the venturi portion 24a of the carburetor 24. A second diaphragm 88 having at the central portion thereof an air bleed opening (no numeral), is disposed under the first diaphragm 82, to form part of second diaphragm means (no numeral). The second diaphragm 88 is fixedly connected through a cup-shaped valve housing 90 to the central portion of the first diaphragm 82 and defines a middle chamber 86b between it and the first diaphragm 82. The middle chamber 86b communicates with the atmosphere through an opening 92 of the housing 84. The cup-shaped valve housing 90 is formed with a closed end portion 90a attached to the central portion of the first diaphragm 82, a cylindrical wall portion 90b having an opening (no numeral) for communicating the inside of the valve housing 90 with the middle chamber 86b, and an open end portion 90c. The open end portion 90c is provided with an inwardly-protruding flange portion (no numeral) which is fixed to the second diaphragm 88. The flange portion defines at the central portion thereof an opening (no numeral) which coincides with the air bleed opening of the second diaphragm 88. A valve head 94 is located within the valve housing 90 and is arranged to open and close the opening defined by the flange portion to open and close the air bleed opening of the second diaphragm 88. The valve head 94 is normally urged by a spring 96 located between the closed end portion 90a and the valve head 94 working in such a direction that the valve head 94 sealingly contacts the inner surface of its seat or the inwardly-protruding flange portion of the valve housing 90. The second diaphragm 88 defines an output vacuum chamber 86c between it and the lower portion of the housing 84. From the bottom of the output vacuum chamber 86c, a vacuum pipe 98 extends upwardly and has an open end thereof which is contactable with the flat surface of the valve head 94. The vacuum pipe 98 is connected to the vacuum reservoir 80. The output vacuum chamber 86c communicates with the vacuum chamber 60a' of the exhaust gas recirculation control valve 46. Within the input vacuum chamber 86a, a spring 100 is disposed between the upper portion of the housing 84 and the first diaphragm 82 to bias the first diaphragm 82 in such a direction that the volume in the input vacuum chamber 86a decreases.

Control means 102 includes a swingable arm 104 which is pitovally supported at its midportion to a member (no numeral) secured to the inner wall of the housing 84. The swingable arm 104 is connected at its one end to the central portion of the first diaphragm 82 and at its other end to a rod 106 which is fixedly connected to a diaphragm member 108. The diaphragm member 108 separates the inside of a housing 110 into a vacuum chamber 110a and an atmospheric chamber 110b which communicates with the atmosphere. The diaphragm member 108 is urged by a spring 112 in the direction to force the valve head 94 to unseat from the open end of the vacuum pipe 98 through a link mechanism including the rod 106 and the arm 104. The vacuum chamber 110a communicates with the venturi portion 114a formed in an oil passage 114 which is connected to an oil pump 116 driven by the engine. It will be understood that the venturi portion 114a produces a vacuum in response to the engine speed, since the oil pump 116 is driven by the engine.

With the arrangement of the exhaust gas control means 44 described hereinbefore, when the carburetor venturi vacuum is introduced into the input vacuum chamber 86a and acts on the first diaphragm 82, the first diaphragm 82 is moved upwardly and therefore the valve head 94 of the second diaphragm means ascends to open the end of the vacuum pipe 98 leading from the vacuum source 80. Then, vacuum from the vacuum source acts on the diaphragm member 58' of the exhaust gas recirculation control valve 46 to allow the exhaust gases to flow from the exhaust system into the intake manifold 23. When the vacuum level within the output vacuum chamber 86c gradually increases and acts on the second diaphragm 88 to pull same downwardly, the valve head 94 of the second diaphragm means is also moved downwardly and closes off the open end of the vacuum pipe 98. In this state, equilibrium is established between the force exerted on the first diaphragm means and the force exerted on the second diaphragm means.

The output vacuum, thus amplified, in the output vacuum chamber 86c acts on the diaphragm member 58' of the exhaust gas recirculation control valve 46 and causes the valve member 68' to proportionally open the restriction opening 78 in accordance with the input vacuum in the input vacuum chamber 86a.

When the input vacuum in the input vacuum chamber 86a decreases below the level of the above equilibrium condition, the balance between forces exerted on the first and second disphragm means is disturbed and therefore the second diaphragm 88 is moved downwardly in the direction of the output vacuum chamber 86c. Accordingly, the valve head 94 of the second diaphragm means is pushed up and therefore the opening located beneath the valve head 94 opens. Then, atmospheric air in the middle chamber 86b bleeds into the output vacuum chamber 86c through the opening of the cylindrical wall portion 90b and the seat beneath the valve head 94. When the vacuum level in the output vacuum chamber 86c begins to decrease and the force exerted on the second diaphragm means decreases below the force exerted on the first diaphragm means, the second diaphragm 88 is again pulled upwardly by the first diaphragm 82 and the valve head 94 closes the opening of the second diaphragm 88 (at this time, vacuum pipe 98 is closed). In this state, the equilibrium is again established to balance the forces exerted on the first and second diaphragm means.

It will be seen that the degree of the opening formed by the valve head 68' of the exhaust gas recirculation control valve 46 is thus regulated to control the EGR rate in response to the carburetor venturi vacuum. Furthermore, the vacuum amplifier 64' amplifies the carburetor venturi vacuum in accordance with the effective area ratios of the first and second diaphragms 82 and 88, and normally control the exhaust recirculation control valve 46 in the operating characteristics same as the first exhaust gas recirculation control valve 46a of FIG. 8.

In addition to the above-described operation of the exhaust gas recirculation control valve 46, when the vacuum at the venturi portion 114a of the oil passage 114 increases with the increase of the engine speed, the diaphragm member 108 of the control means 102 moves upwardly to bias downwardly the first diaphragm 82 through the rod 106 and the arm 104. On the contrary, when the vacuum at the venturi portion 114a decreases with the decrease of the engine speed, the diaphragm member 108 moves downwardly to decrease the biasing force by the arm 104. It will be understood from the foregoing that the control means 102 functions to decrease the operating vacuum transmitted to the exhaust gas recirculation control valve 46 in accordance with the increase of the engine speed and therefore contributes to change the EGR rate control characteristics by the exhaust gas recirculation control valve 46 into that of the pattern shown in FIG. 11.

It will be appreciated from the foregoing that by suitably determining the operating characteristics of the control means 102 and the exhaust gas recirculation control valve 46, the maximum point of the EGR rate is set above the R/L line representing the engine operation at road load, and at an operating range in which the frequency of acceleration is the highest in the normal engine operating range. Accordingly, the EGR rate control by the exhaust gas recirculation control valve 46 is accomplished in the desirable pattern shown in FIG. 11.

From the foregoing discussion, it will be understood that stable and smooth combustion of the air-fuel mixture in the combustion chamber is achieved even if the EGR rate is considerably high by shortening the combustion time of the air-fuel mixture. In this regard, further measures discussed hereinafter are taken in order to improve the previously described combustion time shortening effect.

Figure 15:
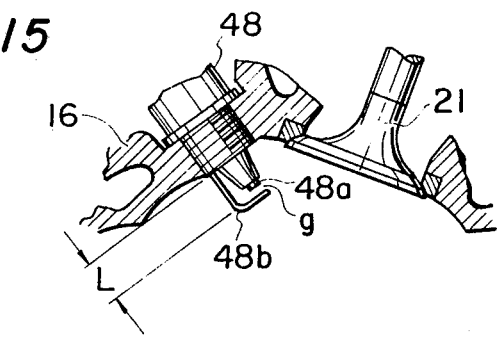
FIG. 15 is a vertical section view showing an example of the spark plug location in the engine of FIG. 1.
Figure 16:
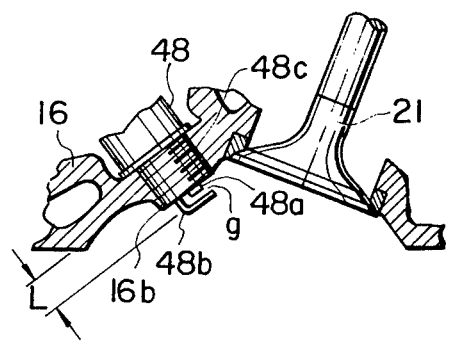
FIG. 16 is a vertical section view similar to FIG. 15, but shows another example of the location of the spark plug.

As clearly shown in FIGS. 15 and 16, the spark plug 48 is projected toward the central portion of the combustion chamber, since the flame produced by the spark of the plug spreads spherically with the center at a point where the spark is produced. However, it was thought that the spark plug located at or near the central portion of the combustion chamber is subjected to an extremely high temperature and would be thermally damaged. However, experiments reveal that combustion efficiency is improved and the durability of the spark plugs is not reduced by locating it such that the midpoint of the spark gap thereof is projected and spaced apart from the inner wall surface of the cylinder head 16 by a distance L ranging from 2 to 7 mm. In order to project the midpoint of the spark gap of the spark plug 48 toward the central portion of the combustion chamber, the central and side electrodes 48a and 48b are considerably extended as seen in FIG. 15, or the threaded portion 48c is extended from the inner surface of the cylinder head 16 forming thereinside the combustion chamber by securing the end of the threaded portion 48c inside of a boss 16b or a circular portion formed with the cylinder head surface and projected into the combustion chamber, as clearly shown in FIG. 16. Additionally, the combustion time shortening effect is further improved by forming the spark gap g of the spark plug 48 within the range from 1.1 to 2.0 mm and arranging the spark plug 48 to produce a spark energy of about 100 mj (milli-joule).

Figure 17:
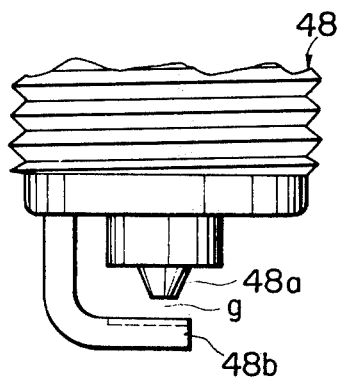
FIG. 17 is a side view showing the electrodes of the spark plug of the engine of FIG. 1.
Figure 18:
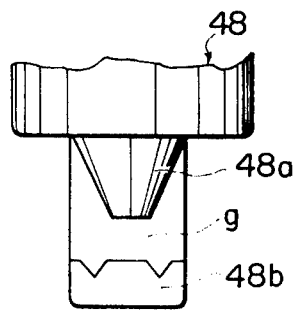
FIG. 18 is a front view showing the electrodes of the spark plug of FIG. 17.

Furthermore, it was observed that the electrodes of the spark plug 48 do not undergo a thermal damage due to the generated high temperature and their ignition effect is improved by forming, as shown in FIGS. 17 and 18, the central electrode 48a into the shape of a frustum of a cone (the diameter of the top flat surface of central electrode 48a is within the range from 0.50 to 0.63 mm) and forming grooves (no numerals) on the side electrode surface opposite to the central electrode 48a. The ignition effect of the spark plug of the above-mentioned arrangement may be improved by setting the ignition timing at the minimum or near the minimum advance required for best torque.

With reference to FIGS. 2 and 3, as the area of the annular flat portion 16a of the cylinder head adjacent the hemispherical cavity 50 increases, the squish area is increased and accordingly the effect of the squish turbulence is increased. However, since the squish area contacts the inner surface of the cylinder 12 which is cooled by a coolant (not shown) flowing outside the cylinder 12, the air-fuel mixture residing in the squish area 52 is cooled and does not react readily, which may cause the flame in the combustion chamber to go out and possibly cause misfire of the engine. Therefore, the emission level of unburned hydrocarbons (HC) is increased with the increase of the area of the annular flat portion of the cylinder head adjacent the hemispherical cavity 50. In view of the foregoing, the area of the annular flat portion 16a of the cylinder head 16 should be determined such that the emission level of hydrocarbons is not, to any extent, increased but that sufficient squish turbulence is produced. Experiments reveal that it is preferable for obtaining the above-described intended purpose that the area of the annular flat portion 16a is in the range from 0.1 to 0.45 times the cross-sectional area of the bore of the cylinder 12. Furthermore, the thickness St of the squish area 52 or the distance between the annular flat portion 16a of the cylinder head 16 and the crown of the piston 18 at the top dead center is preferably in the range from 1.05 to 2.5 mm in order to obtain the best effect due to the squish area 52.

It will be understood that improved mixing of fuel and air and uniform dispersion of the recirculated exhaust gas in the combustion chamber may be attained by producing swirl turbulence due to the momentum of the high-speed incoming gas in addition to the squish turbulence due to the squish area 52.

As is apparent from the foregoing, a remarkable decrease of NOx emission level has been made possible without deterioration of the stable and smooth combustion of the air-fuel mixture in the combustion chamber. Additionally, the measures hereinafter described are taken to further promote the oxidation reaction carried out in the reactor 26 to improve the conversion efficiencies of CO and HC into harmless compounds.

In this regard, as illustrated in FIG. 1, the engine 10 employs the siamesed exhaust port outlet arrangement 22a or 22b to prevent exhaust gas temperature drop which results from the transfer of exhaust gas heat to the cylinder head 16. Accordingly, the temperature within the reactor 26 is maintained high, sufficient for effective oxidation reaction of CO and HC in the reactor 26. The high reactor temperature maintaining effect is further improved by installing the port liner 54, as clearly shown in FIG. 2, on the surface of each exhaust port outlet 22a (22b) to cover the surface of the exhaust port maintaining the space 55 between the surface of the exhaust port outlet and the outer surface of the heat-resistant liner 54.

The experiments by the inventors have also revealed that, by setting the diameter de of the exhaust valve head 21 within the range from 0.40 to 0.50 times the diameter D of the cylinder bore as shown in FIG. 3, the preventing effect of exhaust gas temperature drop is further promoted in addition to the siamesed exhaust port outlet arrangement 22a or 22b with the port liner 54 disposed on the surface of the siamesed exhaust port outlet. In this connection, it has been observed that the pumping loss of the engine was decreased and accordingly the fuel consumption characteristics was improved by setting the diameter di of the intake valve 19 within the range from 0.45 to 0.55 times the diameter D of the cylinder bore as shown in FIG. 3.

In order to further improve the emission control of NOx, CO and HC, the engine 10 may employ in its exhaust system a so-called three-way catalytic converter (not shown) capable of reduction of NOx and oxidation of CO and HC. In this case, since the three-way catalytic converter can exhibit the highest conversion efficiency only when the oxygen-combustible ratio of the exhaust gases introduced to the three-way catalytic converter is stoichiometric or near, it is required to strictly control the air-fuel ratio of the air-fuel mixture supplied to the combustion chamber of the engine 10. Accordingly, it is desirable to supply the air-fuel mixture into the combustion chamber of the engine using a known electronically controlled fuel injection system or using a carburetor which is controlled, for example, such that the fuel amount or the air amount supplied through the carburetor are controlled in response to the oxygen-combustible ratio of the exhaust gases which ratio is sensed by an oxygen sensor disposed in the exhaust system of the engine.

As is apparent from the foregoing discussion that, according to the present invention, the emission level of NOx can be decreased by adding substantially inert gas to the air-fuel mixture inducted into the combustion chamber during normal engine operation so that the weight ratio of the substantially inert gas to the fuel substantially combusted in the combustion chamber is within the range from 13.5:1 to 18.5:1. Moreover, the deteriorated combustion due to addition of such a high rate of the substantially inert gas is improved by locating the spark plug such that the travel distance of the flame produced in the combustion chamber is shortened to decrease the combustion time of the air-fuel mixture in the combustion chamber. Accordingly stable and smooth combustion is carried out in the combustion chamber, causing improvements in engine power output characteristics and fuel consumption characteristics. Additionally, CO and HC contained in the exhaust gases from the combustion chamber are introduced into the reactor, maintaining the exhaust gas temperature high, to be effectively oxidized in the reactor, and therefore the emission levels of CO and HC are remarkably decreased, to tolerable values.

Figure 19:
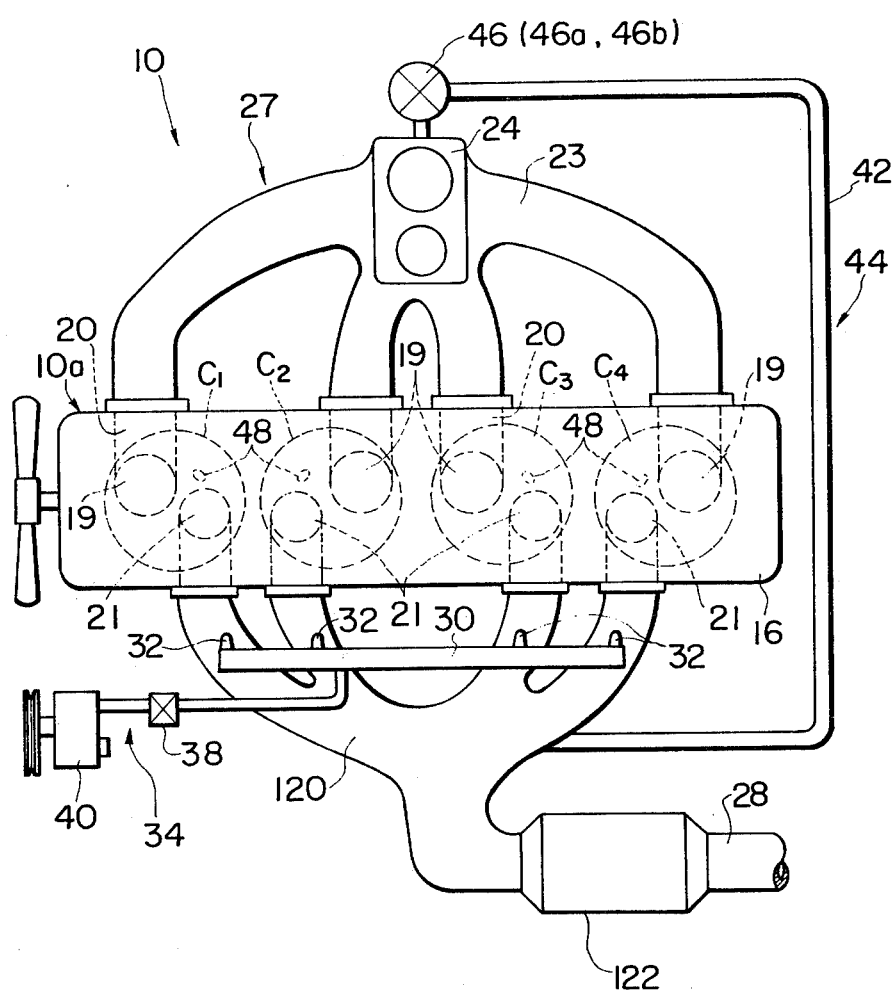

FIG. 19 shows a second preferred embodiment of the engine 10 according to the present invention which is similar to that of the embodiment shown in FIG. 1 with the exception that the carburetor 24 is arranged to supply air-fuel mixture having a mean air-fuel ratio slightly richer than stoichiometric, and the secondary air injection nozzles 32 open to an exhaust manifold 120 which feeds the exhaust gases into an oxidation catalytic converter 122. With this arrangement, CO and HC contained in the exhaust gases from the combustion chambers are oxidized in the catalytic converter 122 in the presence of secondary air supplied from the secondary air injection nozzles 32.

Figure 20:
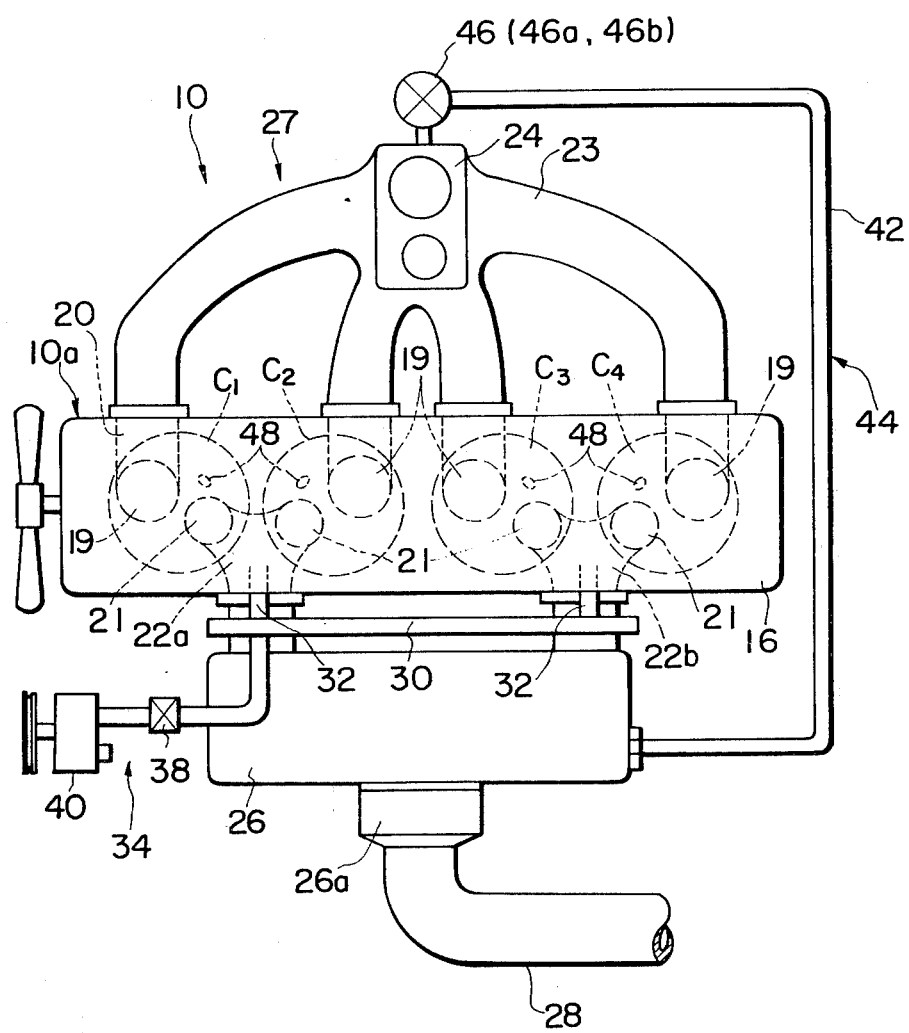

FIG. 20 shows a third preferred embodiment of the engine 10 according to the present invention which is similar to that of the embodiment of FIG. 1 except for a container 26a containing therein a heat-resistant catalytic material or catalytic materials, which container 26a is secured downstream of the reactor 26. Accordingly, with this arrangement, CO and HC contained in the exhaust gases discharged from the combustion chambers are effectively catalytically oxidized by oxygen present even before the engine warmup is still not complete and the exhaust gas temperature has not been raised sufficiently for working the reactor 26.

Figure 21:
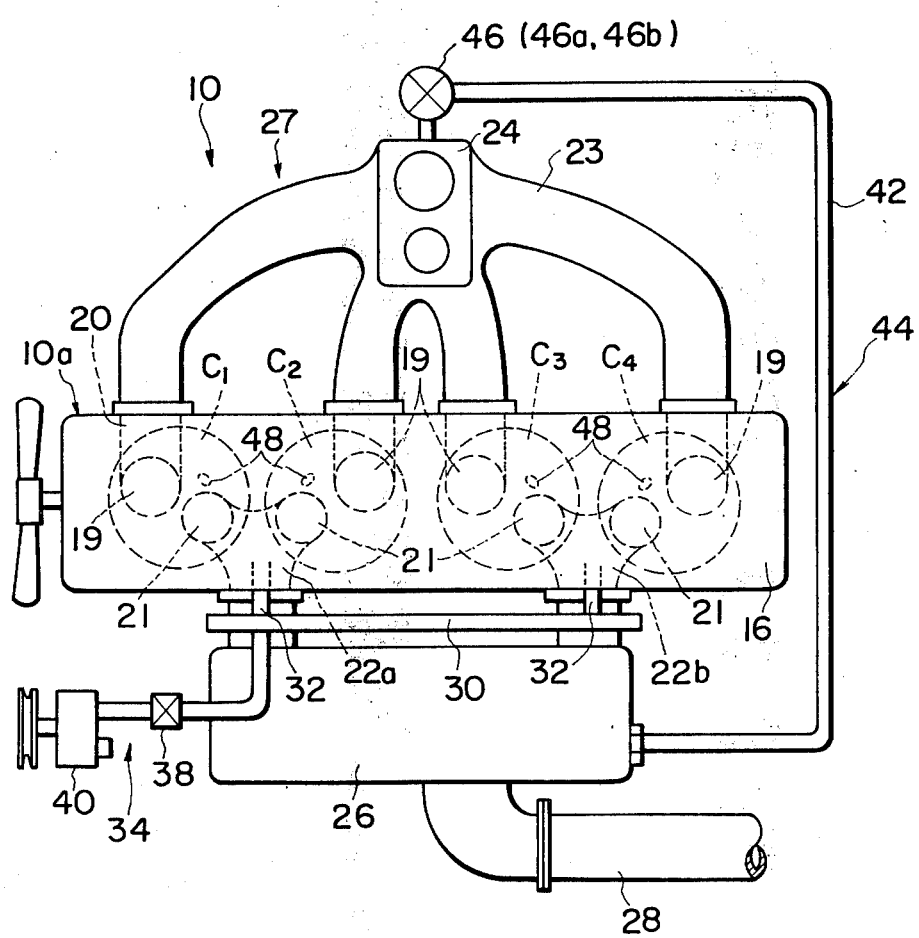

FIG. 21 shows a fourth preferred embodiment of the engine 10 in accordance with the present invention which is similar to the embodiment of FIG. 1 with the exception that nearly the total substantially inert gas is supplied to the combustion chamber by the exhaust gas recirculation system. In this substantially inert gas supply manner, the fuel to inert gas ratio can be controlled to a desired level with less fluctuation of the fuel to inert gas ratio.

Figure 22:
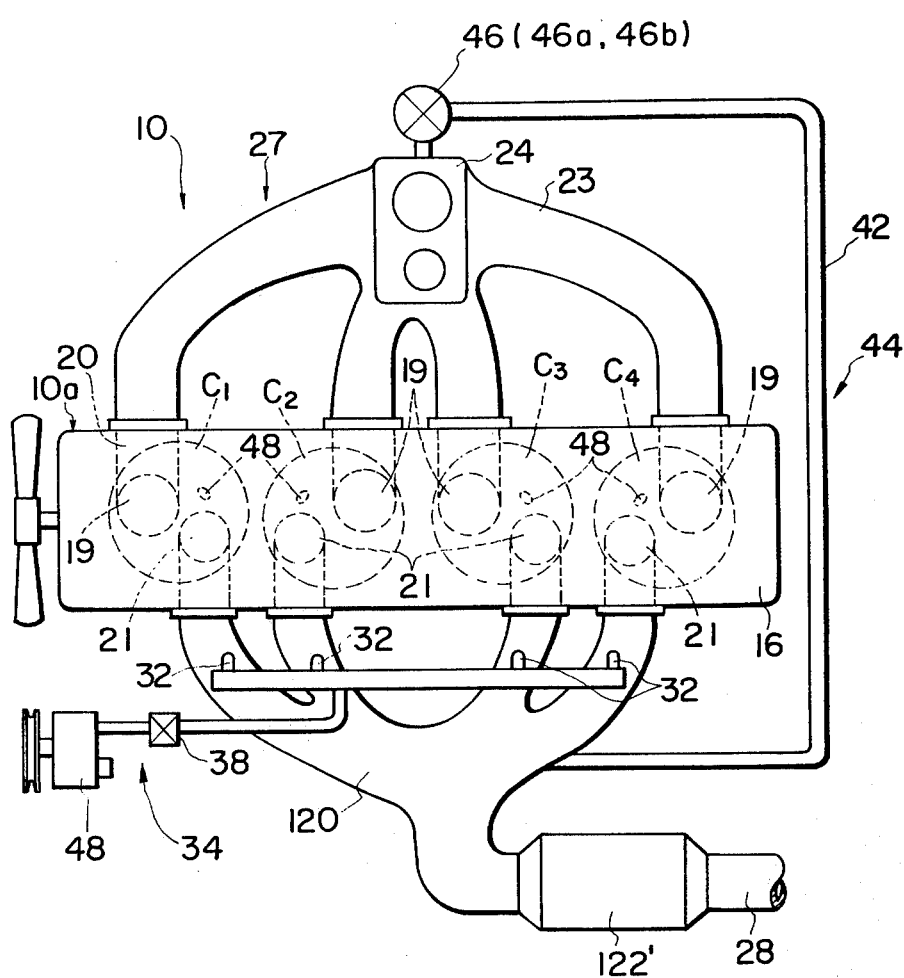

FIG. 22 shows a fifth preferred embodiment of the engine 10 according to the present invention which is similar to the embodiment of FIG. 19 except for the oxidation catalytic converter 122'. The catalytic converter 122' is arranged to effectively work at a lower temperature than the catalytic converter 122 of FIG. 19 and accordingly a sufficient emission level decreasing effect of CO and HC is obtained even in the case where the measures for preventing exhaust temperature drop are not employed.

Figure 23:
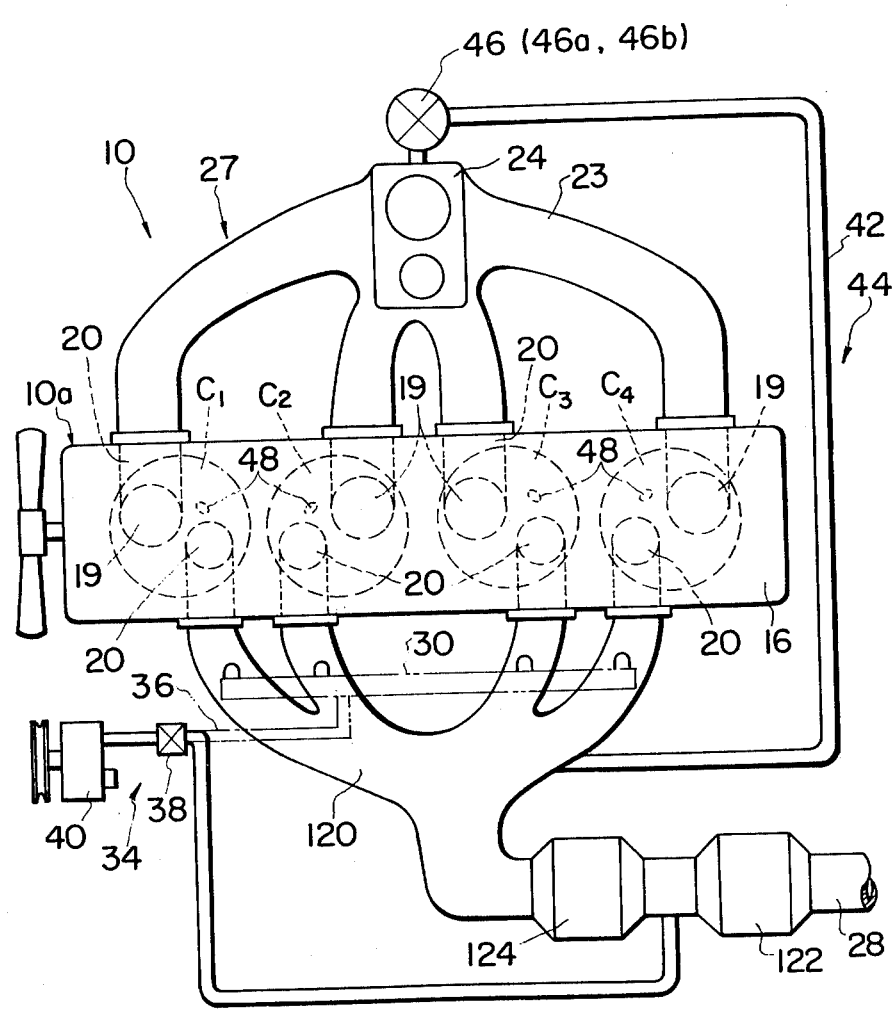

FIG. 23 shows a sixth preferred embodiment of the engine 10 according to the present invention which is similar to the embodiment of FIG. 19 with the exception that a reduction catalytic converter 124 is connected downstream of the exhaust manifold 120 and the oxidation catalytic converter 122 is connected downstream of the reduction catalytic converter 124. Additionally, the oxidation catalytic converter 122 is arranged to be supplied with the secondary air from the secondary air pump 40 via a pipe (no numeral) branched off from the secondary air supply pipe 36. Accordingly, NOx in the exhaust gases is reduced by the reduction catalytic converter 124 and CO and HC in the exhaust gases are oxidized in the oxidation catalytic converter 122.

Figure 24:
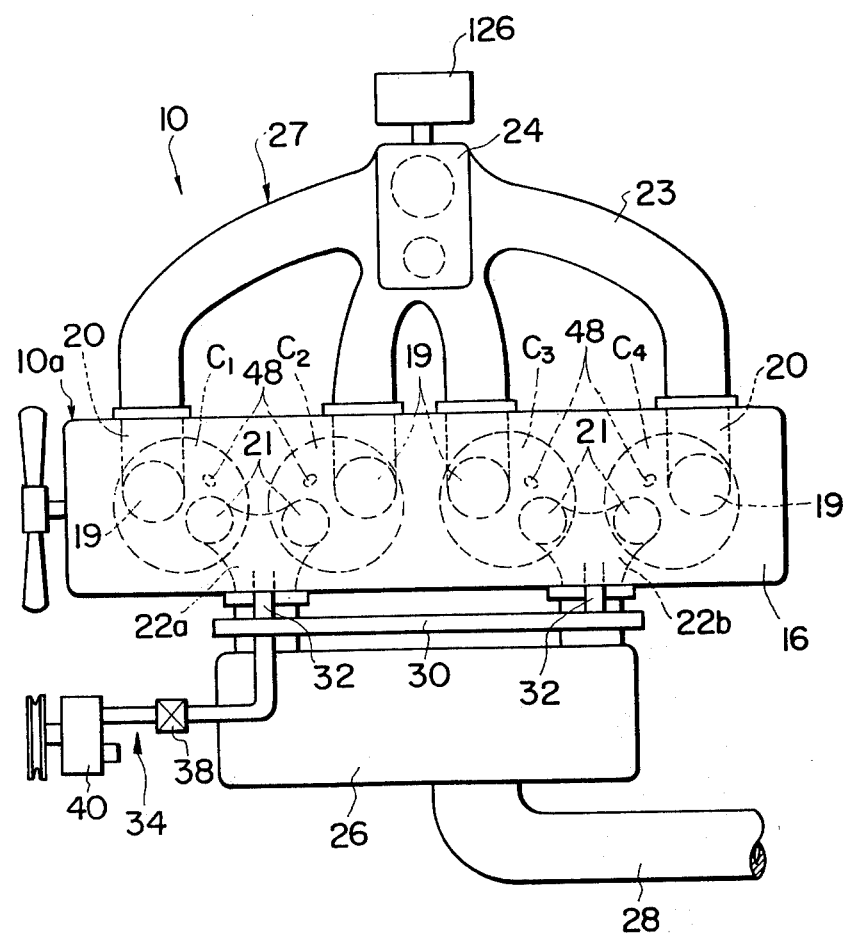

FIG. 24 shows a seventh preferred embodiment of the engine 10 according to the present invention which is similar to the embodiment of FIG. 1. However, this engine 10 is equipped with a device 126 for supplying excessive air into the combustion chamber of the engine, in place of the exhaust gas recirculation system 44 of FIG. 1. It will be understood that the fuel to inert gas ratio can also be controlled to a desired value by suitably controlling the amount of the excessive air supplied to the combustion chamber.

Figure 25:
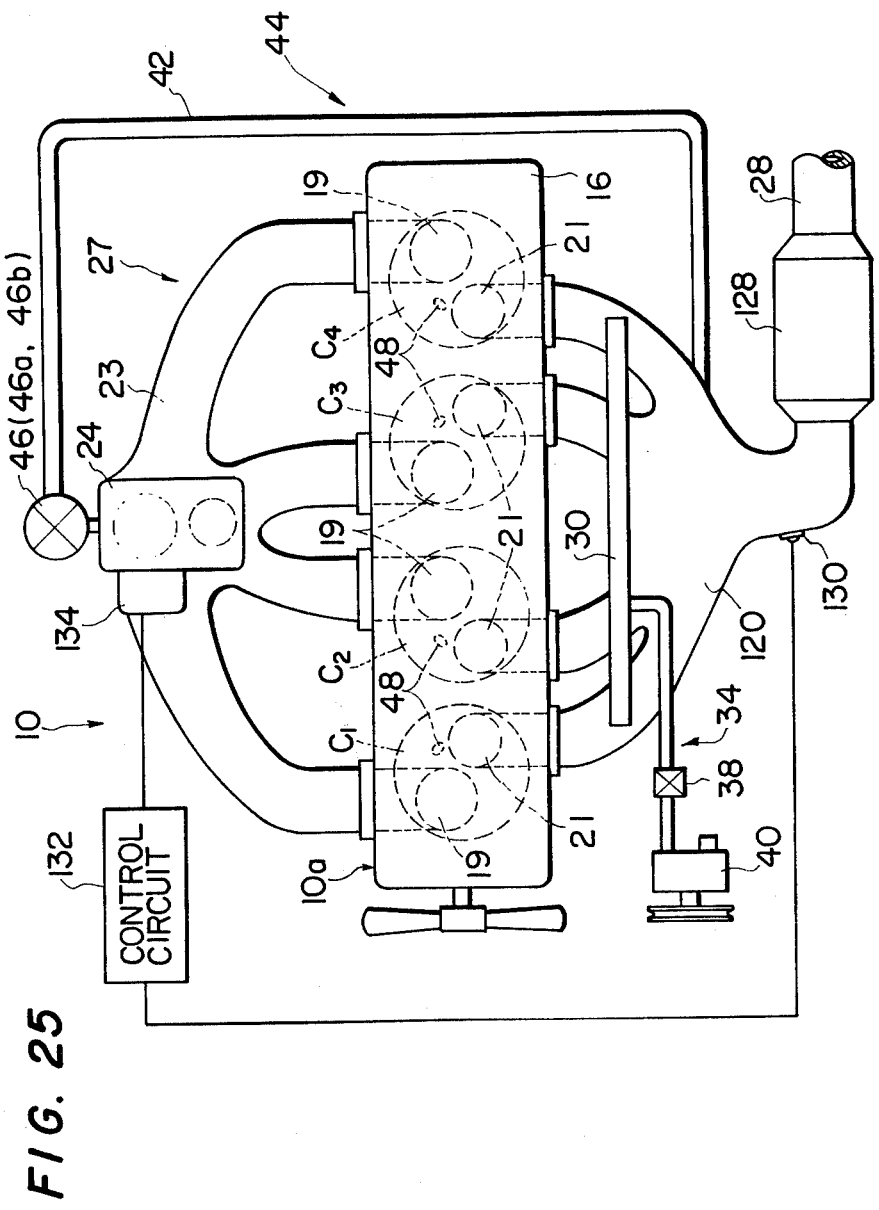

FIG. 25 shows an eighth preferred embodiment of the engine 10 in accordance with the present invention which is similar to the embodiment of FIG. 24 with the exception that the air-fuel ratio of the mixture supplied to the combustion chambers of the engine is controlled approximately stoichiometric in response to the exhaust gas composition in order to effectively work a three-way catalytic converter 128 which is connected downstream of the exhaust manifold 120. As seen in the figure, an exhaust gas sensor 130 is disposed upstream of the three-way catalytic converter 128 to sense the exhaust gas composition and generate an electrical signal representing the exhaust gas composition. The exhaust gas sensor 130 is electrically connected to a control circuit 132. The control circuit 132 is electrically connected to an air-fuel ratio control device 134 for controlling the air-fuel mixture supplied from the carburetor 24 and therefore the air-fuel ratio of the mixture supplied into the combustion chambers is controlled stoichiometric or near stoichiometric in response to the exhaust gas composition sensed by the exhaust gas sensor 130.

Figure 26:
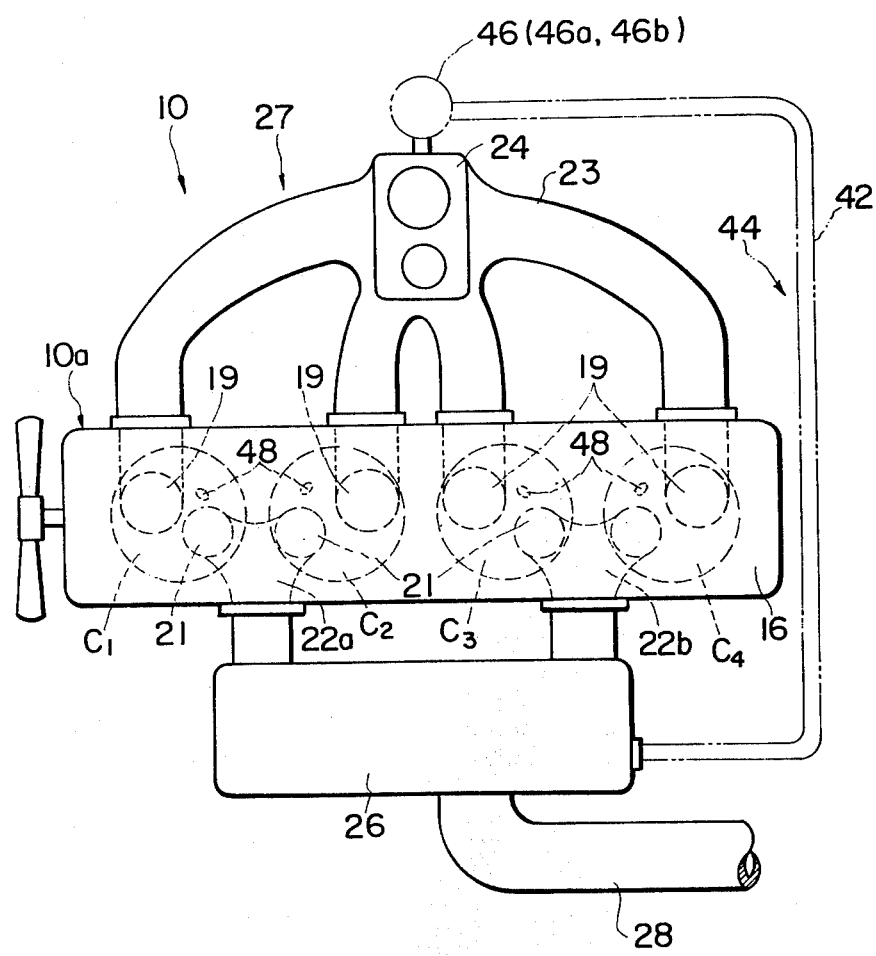

FIG. 26 shows a ninth preferred embodiment of the engine 10 according to the present invention which is similar to the embodiment of FIG. 1 with the exception that the carburetor 24 is arranged to supply the combustion chambers with an air-fuel mixture leaner than stoichiometric and consequently the secondary air supply means 34 is deleted. With this arrangement, since the combustion chambers of the engine are supplied with the lean air-fuel mixture, NOx generation in the combustion chambers is remarkably suppressed.

What is claimed is:

1. A spark-ignition internal combustion engine, comprising:
   a combustion chamber defined by the cylindrical wall of a cylinder of the engine, the inner wall surface of the cylinder head of the engine closing the one end of the cylinder, and the crown of a piston reciprocally movably disposed within the cylinder;
   air-fuel mixture supply means for producing an air-fuel mixture for the combustion chamber by mixing fuel and intake air inducted into the combustion chamber;
   means for adding substantially inert gas to the air-fuel mixture, said substantially inert gas being mixed gases which remain substantially inert after the combustion of the fuel in the combustion chamber, said means for adding substantially inert gas including control means capable of controlling the ratio of fuel combusted in the combustion chamber and the substantially inert gas in the range from 1:13.5 to 1:18.5 by weight, during normal engine operation;

a spark plug disposed in the combustion chamber, said spark plug having a central electrode and a side electrode defining therebetween a spark gap said spark plug being located such that the volume defined in the combustion chamber by the inner spherical surface of an imaginary sphere in the combustion chamber occupies more than 35% of the volume of the combustion chamber which is defined by the crown of the piston at top dead center, said imaginary sphere being formed with its center at the midpoint of the spark gap with a radius R (meter) which is represented by the following equation:

$$R = \theta Rc/6N$$

where,
$\theta$ = spark advance (crank angle, degrees)
N = engine speed (rpm)
Rc = combustion rate (m/s).

2. A spark-ignition internal combustion engine, comprising:

a combustion chamber defined by the cylindrical wall of a cylinder of the engine, the inner wall surface of the cylinder head of the engine closing the one end of the cylinder, and the crown of a piston reciprocally movably disposed within the cylinder;

air-fuel mixture supply means for producing an air-fuel mixture for the combustion chamber by mixing fuel and intake air inducted into the combustion chamber;

means for adding substantially inert gas to the air-fuel mixture, said substantially inert gas being mixed gases which remain substantially inert after the combustion of the fuel in the combustion chamber, said means for adding substantially inert gas including control means capable of controlling the ratio of fuel combusted in the combustion chamber and the substantially inert gas in the range from 1:13.5 to 1:18.5 by weight, during normal engine operation;

a spark plug disposed in the combustion chamber, said spark plug having a central electrode and a side electrode defining therebetween a spark gap, said spark plug being located such that the volume defined in the combustion chamber by the inner spherical surface of an imaginary sphere in the combustion chamber occupies more than 35% of the volume of the combustion chamber which is defined by the crown of the piston at the top dead center, said imaginary sphere being formed with its center at the midpoint of the spark gap with a radius R(meter) which is calculated by the following equation when engine speed is 2,000 rpm:

$$R = \theta Rc/12,000$$

where,
$\theta$ = spark advance (crank angle, degrees)
Rc = combustion rate (m/s).

3. A spark-ignition internal combustion engine as claimed in claim 2, further comprising means for purifying the exhaust gases discharged from the combustion chamber at least by oxidizing the unburned constituents contained in the exhaust gases.

4. A spark-ignition internal combustion engine as claimed in claim 2, in which the substantially inert gas includes residual gas which remains in the combustion chamber during the exhaust stroke, exhaust gas which is supplied from the exhaust system of the engine to the combustion chamber, and nitrogen gas contained in the intake air.

5. A spark-ignition internal combustion engine as claimed in claim 4, in which said substantially inert gas further includes oxygen gas contained in excess air contained in an air-fuel mixture leaner than stoichiometric when the engine is operated on an air-fuel mixture leaner than stoichiometric.

6. A spark-ignition internal combustion engine as claimed in claim 2, in which the substantially inert gas adding means includes exhaust gas recirculating means for controllably supplying the exhaust gas of the engine into the combustion chamber through the intake system of the engine, said exhaust gas recirculating means including an exhaust gas recirculation passageway connecting a portion of the exhaust system of the engine and a portion of the intake system of the engine, and means for so controlling the amoung of the exhaust gas supplied to the combustion chamber through said exhaust gas recirculation passageway that the maximum EGR rate lies at an engine operating range where the frequency of acceleration is the highest during normal engine operation.

7. A spark-ignition internal combustion engine as claimed in claim 6, in which the exhaust gas amount control means is so arranged to control the exhaust gas amount that the maximum EGR rate lies at an engine operating range where engine speed is within a range of 1400 to 2000 rpm and intake manifold vacuum is within a range of 150 to 200 mmHg.

8. A spark-ignition internal combustion engine as claimed in claim 6, in which the exhaust gas amount control means includes a first exhaust gas recirculation control valve disposed in said exhaust gas recirculation passageway and arranged to control the amount of the exhaust gases passing through said gas recirculation passageway in response to the venturi vacuum generated at the venturi portion of the carburetor of the engine, and a second exhaust gas recirculation control valve disposed in the exhaust gas recirculation passageway between said first exhaust gas recirculation control valve and the intake system and arranged to control the amount of the exhaust gases passing through the exhaust gas recirculation passageway in response to the intake vacuum generated at the intake system of the engine.

9. A spark-ignition internal combustion engine as claimed in claim 8, in which said first exhaust gas recirculation control valve includes a first valve head movably disposed in said exhaust gas recirculation passageway and arranged to open or close said exhaust gas recirculation passageway, and a first vacuum responsive diaphragm to which said first valve head is fixedly connected, normally urged by a first spring in the direction to cause said first valve head to close said exhaust gas recirculation passageway, said first diaphragm member being arranged to move in the direction to cause the first valve head to open said exhaust gas recirculation passageway in response to the vacuum generated at the venturi portion of the carburetor of the engine.

10. A spark-ignition internal combustion engine as claimed in claim 9, in which said second exhaust gas recirculation control valve includes a second valve head movably disposed in said exhaust gas recirculation passageway between said first valve head and the intake system and arranged to open or close said exhaust gas recirculation passageway, and a second vacuum responsive diaphragm to which said second valve head is fixedly connected, normally urged by a second spring in the direction to cause said second valve head to open said exhaust gas recirculation passageway, said second diaphragm member being arranged to cause the second valve head to close said exhaust gas recirculation passageway in response to the intake vacuum.

11. A spark-ignition internal combustion engine as claimed in claim 10, in which said first diaphragm member defines a first vacuum chamber which communicates with the venturi portion of the carburetor, and said second diaphragm member defines a second vacuum chamber which communicates with said exhaust gas recirculation passageway between said second valve head and the portion of the intake system.

12. A spark-ignition internal combustion engine as claimed in claim 11, in which the portion of the intake system is an intake manifold.

13. A spark-ignition internal combustion engine as claimed in claim 11, further comprising a vacuum amplifier disposed between the first vacuum chamber and the venturi portion of the carburetor for amplifying the vacuum generated at the venturi portion of the carburetor to predetermined levels.

14. A spark-ignition internal combustion engine as claimed in claim 6, in which the exhaust gas amount control means includes an exhaust gas recirculation control valve disposed in said exhaust gas recirculation passageway and arranged to control the amount of the exhaust gases passing through said exhaust gas recirculation passageway in response to the vacuum applied thereto, a vacuum amplifier for amplifying the venturi vacuum generated at the venturi portion of the carburetor and applying the amplified vacuum to said exhaust gas recirculation control valve, and control means for controlling the amplified vacuum in response to the engine speed.

15. A spark-ignition internal combustion engine as claimed in claim 14, in which said exhaust gas recirculation control valve includes a valve head disposed in said exhaust gas recirculation passageway and arranged to open or close said exhaust gas recirculation passageway, a vacuum responsive diaphragm member to which said valve head is fixedly connected, normally urged by a spring in the direction to cause said valve head to close the exhaust gas recirculation passageway, said diaphragm member being arranged to cause said valve head to open the exhaust gas recirculation passageway in response to the amplified vacuum applied thereto.

16. A spark-ignition internal combustion engine as claimed in claim 14, in which said exhaust gas purifying means includes a three-way catalytic converter disposed downstream of the combustion chamber so as to catalytically reduce nitrogen oxides and oxidize carbon monoxide and hydrocarbons.

17. A spark-ignition internal combustion engine as claimed in claim 15, in which said diaphragm member defines a vacuum chamber to which the amplified vacuum is introduced.

18. A spark-ignition internal combustion engine as claimed in claim 17, in which said vacuum amplifier includes a housing, a first diaphragm means disposed in said housing and defining an input vacuum chamber between said first diaphragm means and the upper portion of said housing, the input vacuum chamber communicating with the venturi portion of the carburetor of the engine, second diaphragm means disposed in said housing and fixedly connected to said first diaphragm means, said second diaphragm means defining between said first and second diaphragm means a middle chamber communicating with the atmosphere, and further defining between said second diaphragm means and the lower portion of said housing an output vacuum chamber communicating with the vacuum chamber of said exhaust gas recirculation control valve, and a vacuum pipe which extends into the output vacuum chamber and communicates with a vacuum source, the other end of said vacuum pipe being arranged to be selectively openable by said second diaphragm means.

19. A spark-ignition internal combustion engine as claimed in claim 18, in which said control means includes a swingable arm which is connected at its one end to the first diaphragm means of said vacuum amplifier and pivotally supported at its midportion to the housing of said vacuum amplifier, a diaphragm member to which the other end of said swingable arm is connected, normally biased by a spring in the direction to cause, through the first diaphragm means, the second diaphragm means to separate from the other end of the vacuum pipe of said vacuum amplifier, said diaphragm member defining a vacuum chamber, and means for producing a vacuum in response to the engine speed and transmitting it to said vacuum chamber.

20. A spark-ignition internal combustion engine as claimed in claim 19, in which the vacuum producing means includes the venturi portion formed in an oil passage connected to an oil pump which is driven by the engine.

21. A spark-ignition internal combustion engine as claimed in claim 18, in which said second diaphragm means includes a diaphragm member having an air bleed opening which is communicable with atmospheric air through said medium chamber and said opening of said housing, and a valve head arranged to open and close said air bleed opening and normally biased by a spring into a direction that said valve head closes said air bleed opening, said valve head being contactable with the other end of said vacuum pipe.

22. A spark-ignition internal combustion engine as claimed in claim 21, in which said second diaphragm means further includes a cup-shaped valve housing having an opening for communicating the inside of said valve housing with the middle chamber, a closed end portion which is fixedly attached to said first diaphragm means, and an open end portion having an inwardly-protruding flange portion, the flange portion being fixed to the diaphragm member of said second diaphragm means and defining at its central portion thereof an opening which agrees with the air bleed opening of said diaphragm member of said second diaphragm means, said valve head of said second diaphragm means being located within said valve housing to open and close the opening defined by the flange portion and normally urged by the spring located between the closed end portion of said valve housing and said valve head of said second diaphragm means into a direction that said valve head of said second diaphragm means sealingly contacts with the inner surface of the flange portion to close the air bleed opening of said diaphragm member of said second diaphragm means.

23. A spark-ignition internal combustion engine as claimed in claim 19, in which said vacuum amplifier further includes a biasing spring located within the input vacuum chamber and connecting the upper inside portion of said housing and said first diaphragm means to bias said second diaphragm means into a direction that the volume of the input vacuum chamber decreases.

24. A spark-ignition internal combustion engine as claimed in claim 2, in which said piston is formed with a cavity at its crown.

25. A spark-ignition internal combustion engine as claimed in claim 24, in which said combustion chamber is of a hemispherical type.

26. A spark-ignition internal combustion engine as claimed in claim 24, in which said combustion chamber is of a wedge type.

27. A spark-ignition internal combustion engine as claimed in claim 24, in which said combustion chamber is of a bath-tub type.

28. A spark-ignition internal combustion engine as claimed in claim 25, in which the cylinder head has a hemispherical cavity formed concentrically with the bore of said cylinder, said hemispherical cavity being smaller in diameter than that of the cylinder bore to form an annular flat portion of the cylinder head adjacent the periphery of the combustion chamber, the surface area of the annular flat portion being in the range from 0.1 to 0.45 times the cross-sectional area of the cylinder bore.

29. A spark-ignition internal combustion engine as claimed in claim 28, in which the distance between the annular flat portion and the crown of the piston at the top dead center is in the range from 1.05 to 2.5 mm.

30. A spark-ignition internal combustion engine as claimed in claim 2, wherein said spark plug is located such that the midpoint of its spark gap is spaced apart from the cylinder head inner wall surface by a distance ranging from 2 to 7 mm.

31. A spark-ignition internal combustion engine as claimed in claim 30, in which said spark plug has the spark gap ranging from 1.1 to 2.0 mm.

32. A spark-ignition internal combustion engine as claimed in claim 31, said spark plug is arranged to generate a spark having an energy of about 100 mj.

33. A spark-ignition internal combustion engine as claimed in claim 32, in which the end surface of the central electrode of said spark plug is in the range from 0.50 to 0.63 mm in diameter, the end surface being opposite to the side electrode of said spark plug.

34. A spark-ignition internal combustion engine as claimed in claim 33, in which the side electrode of said spark plug is formed with grooves on its surface opposite to the central electrode.

35. A spark-ignition internal combustion engine as claimed in claim 3, further comprising secondary air supply means for supplying said exhaust gas purifying means with air, wherein said air-fuel mixture supply means is arranged to supply an air-fuel mixture having the mean air-fuel ratio lower than stoichiometric.

36. A spark-ignition internal combustion engine as claimed in claim 35, in which said exhaust gas purifying means includes a reactor disposed downstream of the combustion chamber of the engine for oxidation of the unburned constituents in the exhaust gases from the combustion chamber.

37. A spark-ignition internal combustion engine as claimed in claim 35, in which said exhaust gas purifying means includes an oxidation catalytic converter disposed downstream of the combustion chamber for catalytic oxidation of the unburned constituents contained in the exhaust gases discharged from the combustion chamber.

38. A spark-ignition internal combustion engine as claimed in claim 35, in which said exhaust gas purifying means includes a three-way catalytic converter disposed downstream of the combustion chamber for catalytic reduction of nitrogen oxides and oxidation of carbon monoxide and hydrocarbons.

39. A spark-ignition internal combustion chamber as claimed in claim 38, further comprising means for controlling the air-fuel ratio of the air-fuel mixture produced by said air-fuel mixture supply means to a predetermined value in response to the composition of the exhaust gases discharged from the combustion chamber of the engine.

40. A spark-ignition internal combustion engine as claimed in claim 37, further comprising a reduction catalytic converter disposed upstream of said oxidation catalytic converter for reduction of the reducible constituents contained in the exhaust gases.

41. A spark-ignition internal combustion engine as claimed in claim 40, further comprising means for introducing air from said secondary air supply means into a portion of the exhaust system between said reduction catalytic converter and said oxidation catalytic converter.

42. A spark-ignition internal combustion engine as claimed in claim 35, further comprising means for supplying air into the intake system of the engine to lean out the air-fuel mixture inducted into the combustion chamber and supply the combustion chamber with an air-fuel mixture leaner than stoichiometric.

43. A spark-ignition internal combustion engine as claimed in claim 36, further comprising a container in which an oxidation catalytic material for oxidation of unburned constituents in the exhaust gases is disposed, said container being secured downstream of said reactor.

44. A spark-ignition internal combustion engine as claimed in claim 36, in which said combustion chamber defining means defines another combustion chamber by the inner surface of another cylinder of the engine, the inner surface of the cylinder head of the engine closing one end of the cylinder, and the crown of another piston being movably reciprocally disposed within the cylinder.

45. A spark-ignition internal combustion engine as claimed in claim 44, further comprising means for forming in the cylinder head a combined exhaust port outlet in which the two exhaust outlets of the two exhaust ports of said combustion chamber and said another combustion chamber are combined to form one exhaust outlet.

46. A spark-ignition internal combustion engine as claimed in claim 45, further comprising a liner disposed to cover the inner surface of said combined exhaust outlet maintaining a space between the inner surface of said combined exhaust outlet and the outer surface of said liner.

47. A spark-ignition internal combustion engine as claimed in claim 45, in which said secondary air supply means includes a secondary air injection nozzle open to said combined exhaust outlet, and an air pump connected to said secondary air injection nozzle for admitting pressurized air to said secondary air injection nozzle.

48. A spark ignition internal combustion engine as claimed in claim 2 in which the radius R of the imaginary sphere is substantially 37.5 mm.

* * * * *